United States Patent
Wu et al.

(10) Patent No.: US 12,269,522 B1
(45) Date of Patent: Apr. 8, 2025

(54) SYSTEM, APPARATUS, AND METHOD FOR GROUND TRANSPORTATION

(71) Applicant: SOUTS-NG, LLC, Ridgewood, NJ (US)

(72) Inventors: Frank F. Wu, Silver Spring, MD (US); Yong Shi, Ridgewood, NJ (US)

(73) Assignee: SOUTS-NG, LLC, Ridgewood, NJ (US)

( * ) Notice: Subject to any disclaimer, the term of this patent is extended or adjusted under 35 U.S.C. 154(b) by 0 days.

(21) Appl. No.: 18/608,435

(22) Filed: Mar. 18, 2024

(51) Int. Cl.
| | |
|---|---|
| *B61L 27/04* | (2006.01) |
| *B60L 8/00* | (2006.01) |
| *B61L 25/06* | (2006.01) |
| *B61L 27/10* | (2022.01) |

(52) U.S. Cl.
CPC ............ *B61L 27/04* (2013.01); *B60L 8/003* (2013.01); *B61L 25/06* (2013.01); *B61L 27/10* (2022.01); *B60L 2200/26* (2013.01)

(58) Field of Classification Search
CPC .......... B61L 27/04; B61L 25/06; B61L 27/10; B60L 8/003; B60L 2200/26; B60L 1/00–2270/46
USPC .......................................................... 701/20
See application file for complete search history.

(56) References Cited

U.S. PATENT DOCUMENTS

| | | | | |
|---|---|---|---|---|
| 6,810,817 | B1 * | 11/2004 | James | B61L 23/005 104/88.04 |
| 10,435,037 | B2 | 10/2019 | Zhao | |
| 2001/0001843 | A1 * | 5/2001 | Alofs | G05D 1/0229 701/24 |
| 2009/0173839 | A1 * | 7/2009 | Groeneweg | B61L 27/53 246/15 |
| 2015/0102176 | A1 * | 4/2015 | Tippey | B61L 15/009 246/3 |
| 2016/0101709 | A1 * | 4/2016 | Purpura | B60M 3/00 191/6 |
| 2017/0080953 | A1 * | 3/2017 | Zhao | B61B 1/00 |
| 2018/0186384 | A1 * | 7/2018 | Fisk | B61D 9/08 |
| 2018/0208215 | A1 * | 7/2018 | Zamorano Morfin | B61L 23/007 |
| 2018/0222505 | A1 * | 8/2018 | Chung | B61L 15/0027 |
| 2018/0265098 | A1 * | 9/2018 | Evans | B64U 30/20 |
| 2020/0207238 | A1 * | 7/2020 | Jones | B60M 1/30 |
| 2021/0009350 | A1 * | 1/2021 | Cohen | B61F 99/00 |
| 2021/0039695 | A1 * | 2/2021 | Hosseinipour | G06F 16/9537 |
| 2021/0107546 | A1 * | 4/2021 | Ross | B61L 27/04 |
| 2021/0206402 | A1 * | 7/2021 | Stanley | B61B 3/00 |
| 2022/0144100 | A1 * | 5/2022 | Tamutus | E01B 25/34 |
| 2022/0348241 | A1 * | 11/2022 | Soule | B61L 27/20 |
| 2023/0011746 | A1 * | 1/2023 | Turco | B65G 1/065 |

(Continued)

*Primary Examiner* — Mohamed Abdo Algehaim
(74) *Attorney, Agent, or Firm* — Keefe IP Law, PLLC

(57) ABSTRACT

A method is disclosed. The method includes moving a vehicle having a plurality of wheels along a track, receiving a marker data or a marker signal from a marker at a location of the track using a reader of the vehicle, controlling a first rotational speed of a first wheel of the plurality of wheels at the location of the track based on the marker data or the marker signal, and controlling a second rotational speed of a second wheel of the plurality of wheels at the location of the track, independently of the first rotational speed, based on the marker data or the marker signal. The first rotational speed is different from the second rotational speed.

17 Claims, 22 Drawing Sheets

(56) References Cited

U.S. PATENT DOCUMENTS

| | | | |
|---|---|---|---|
| 2023/0117899 A1* | 4/2023 | Vrba | B61L 27/20 701/2 |
| 2023/0173952 A1* | 6/2023 | Eberlein | B60M 5/00 191/30 |
| 2023/0202533 A1* | 6/2023 | Nativ | E01B 25/28 104/28 |
| 2023/0278434 A1* | 9/2023 | Tamutus | B61B 13/08 105/49 |
| 2023/0339273 A1* | 10/2023 | Williams | E01B 7/00 |
| 2024/0083256 A1* | 3/2024 | Huang | B65G 54/02 |

* cited by examiner

Vehicle receives database update (the delta update) nightly

The database contains speed, distance and turning instructions of each track, and the track joint location based on each milemarker. There will be at least two type of communication methods for database update.

When a new segment is added or removed, the sequence is: update the record on database before removing a segment; add segment before adding record to database.

Each track segment has an identifier, each ram is a segment by its own.

Use I-95 to I495 exchange to illustrate, there will be database entry for MD I-95-S1 (Maryland I95 South track 1), MD I-95-S2 ... MD I-95-S-Ramp1 ... MD I-495-N1 ....

Only the vehicle with confirmation of database update successfully will be activated Milemarker contains marker ID and the most recent wind speed and direction In the vehicle profile, it contains vehicle type, weight, wheel diameter, vibration signature, noise signature So the database may look like this

| Milemarker ID | MD I-95-S1 | Note | Milemarker ID | MD I-95-S-Ramp1 | Milemarker MD I-495-N1 |
|---|---|---|---|---|---|
| MD I-95-S1.0 (note: Maryland) 95 South Bound Milemarker @mile 1.0 | Begin of record Speed: 60.0 mph Headway class: A Track gaps: 10 feet Turning angle: 0 degree Turning arc: N/A Turning Radius: N/A Track splitting: 528 feet Next marker: 1000 ft (repeat 3 more marker instructors) End of record | Lets say class A = .2 seconds Class B = 0.4 seconds | MD I-95-S-Ramp1.0 | Begin of record Speed: 20.5 mph Headway class: A Track gaps: 20 feet Turning angle: 10.5 degree Turning arc: 200 Turning Radius: 600 Track splitting: N/Afeet Next marker: 200 ft Speed: 35 mph Headway class: A Track gaps: N/A Turning arc: 9 degrees | |

*Fig. 8A*

| | | | | |
|---|---|---|---|---|
| MDI-95-S1-1.1 | Begin of record<br>Speed: 60.0 mph<br>Headway class: A<br>Track gaps: 50 feet<br>Turning angle: 0 degree<br>Turning Radius: N/A<br>Track splitting: 528 feet<br>Next marker: 800 ft<br>(repeat 3 more marker instructors)<br>End of record | | | |
| | | Left wheel is going faster for clockwise turning | | Turning arc: 200<br>Turning Radius: 800<br>Track splitting: 500<br>Next marker: 200 ft<br>(repeat 2 more marker instructors)<br>End of record |
| MDI-95-S1-1.2 | | | MDI-95-S-Ramp1.1 | |
| MDI-95-S1-1.3 | | | | |
| MDI-95-S1-1.4 | | | | |
| MDI-95-S1-1.5 | | | | |
| MDI-95-S1-1.6 | | | | |
| | Milemarker messages<br>Milemarker unique ID<br>Wind speed class<br>Wind direction<br>Speed adjustment | Measure value in the past 10 minutes in average<br>Measure value in the past 10 minutes in average (N, NNE, NE, ENE, E, etc.)<br>This is a dynamic value received from time control system to inform passing vehicle what percentage to adjust down the speed. E.g. 5%... To 95% | | |

*Fig. 8B*

| Vehicle profile | |
|---|---|
| Database updated | yyyy/mm/dd : hh/mm/ss |
| Vehicle class | # of seats, cargo, car transporter, wheel chair equipped, additional luggage, etc. |
| Weight class | A-K      A=under 1500 lb, B= under 2,000 lb, ... To K=under 6,500 lb |
| Length class | A-K      A=12 feet, B=15 feet, etc. |
| Wheel diameter | 20.1" |
| Vibration signature | data here |
| Noise signature | data here |
| Vehicle ID | this number is fixed, requires manual process to make change |

How it works:

When a POD is dispatched to a new destination, the onboard computer calculate the best route, in the same way as GPS; as a result, the series of segments are stringed together as a working table. Each time the POD passes a milemarker, it performs data look on the working table to determine the speed and head way of the upcoming segment; it use this information to calculate each wheel's rotational speed, use the on-board gyro sensor to check whether the turning angle agrees with the information in the database (this is a part of system wide self diagnostic, it reports any disagreement between angle and the calculated wheel speed), the incline of track compensates minor error automatically due to the natural of gravity.

POD uses the vehicle profile to adjust the headway, e.g. light weight pod may keep 50 feet distance for headway class A, but a heavier vehicle will add a percentage to it due to its heavier mass. The milemarker may use this feature to stretch the headway distance in certain infrastructure, such as a long span bridge to reduce the dynamic load to the bridge structure.

*Fig. 8C*

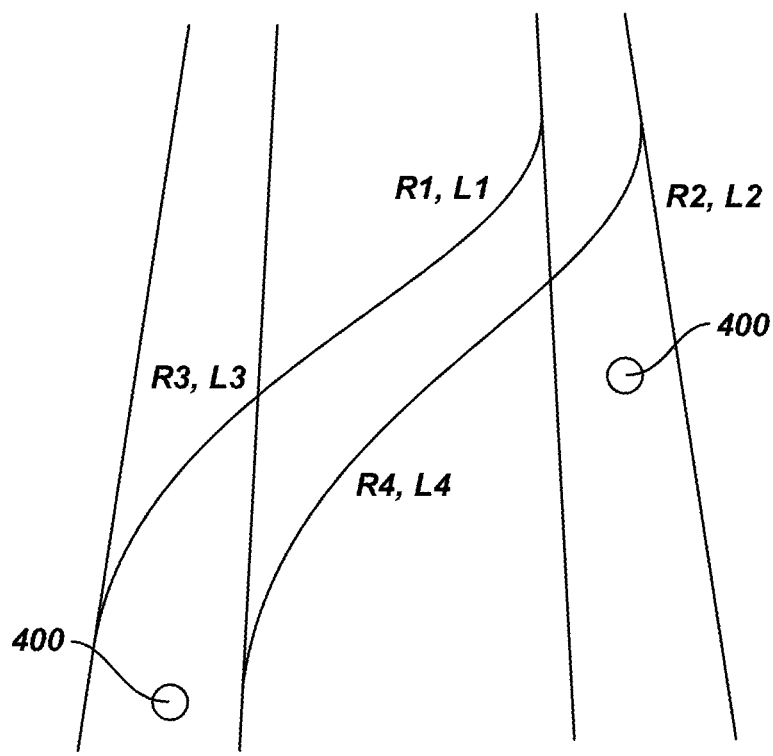
*Fig. 15*
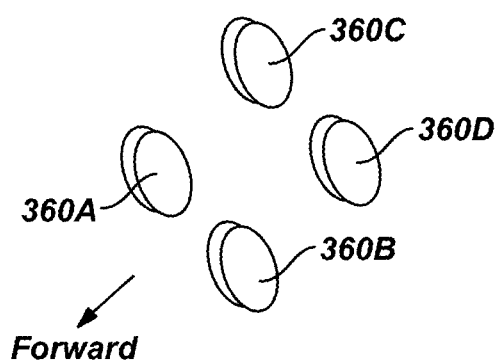 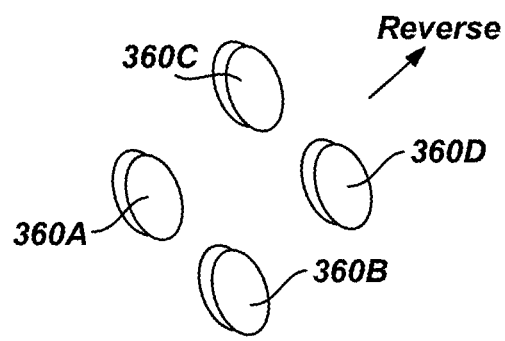
*Fig. 16A*  *Fig. 16B*

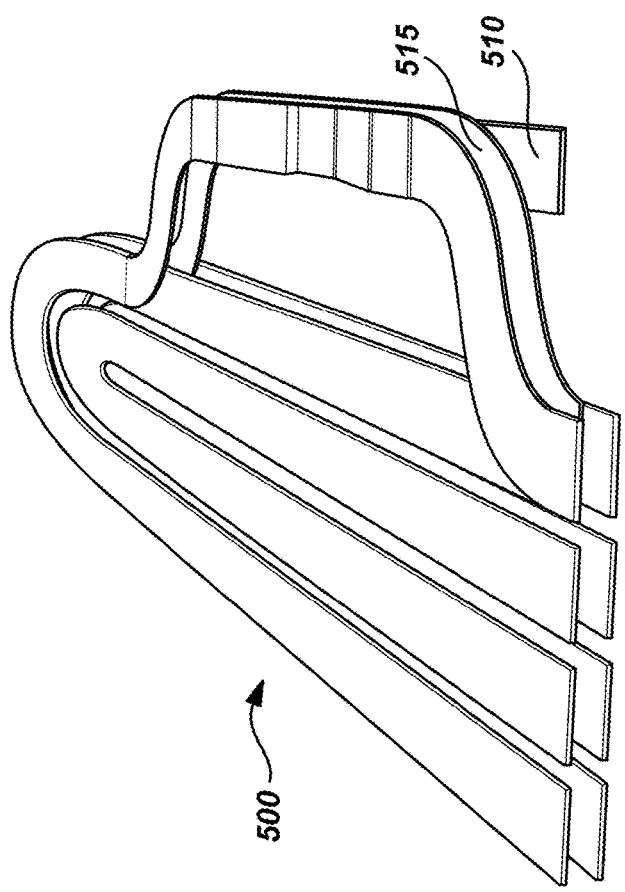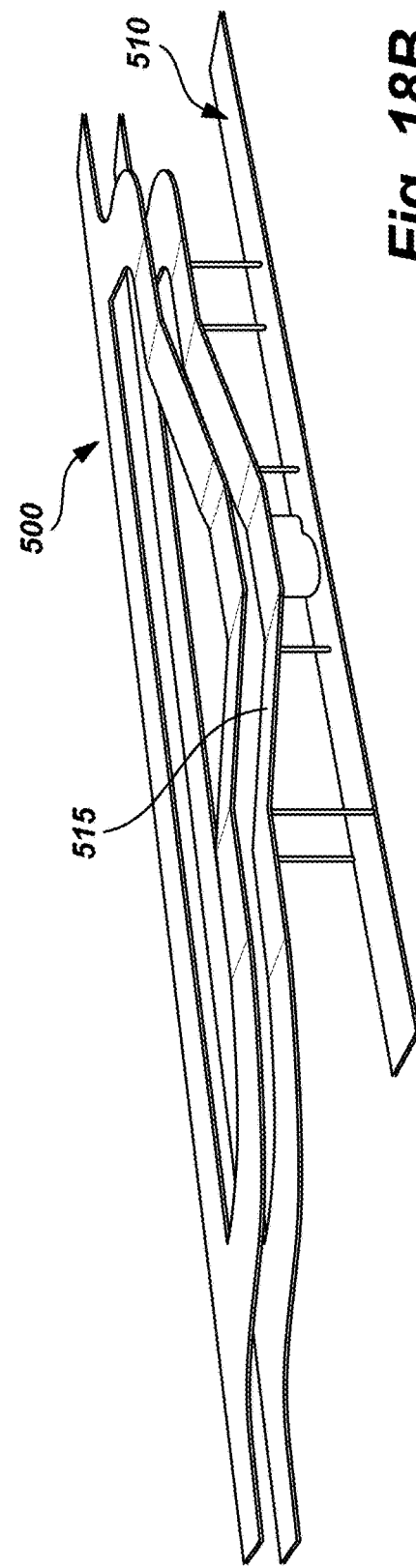

SYSTEM, APPARATUS, AND METHOD FOR GROUND TRANSPORTATION

TECHNICAL FIELD

The present disclosure generally relates to a system, apparatus, and method for transportation, and more particularly to a system, apparatus, and method for ground transportation.

BACKGROUND

Existing systems for public ground transportation, whether for relatively long distance travel or for commuting, typically involve transporting passengers using relatively large vehicles such as trains or buses. For example, buses may transport many dozen passengers while trains may transport several hundred passengers or more using train cars that each may accommodate many dozen passengers or more. These existing systems typically operate based on buses and trains making stops and taking routes according to a schedule and scheduled stops that remain fixed for several months or more, with passengers making transfers between these routes. This is also true for regional air travel.

For example, existing systems for public ground transportation over relatively long distances involve passengers arriving at a station along with many other passengers. Passengers may expend additional time (to wait for the available service schedule) to arrive early to account for delays in traveling to the station, which may result in extended wait times. Several legs of travel may be involved in reaching a final destination, with passengers waiting for extended periods of time at intermediate stations. Travel vehicles may be crowded with other passengers. Accordingly, existing systems usually involve time-consuming travel due to waits and delays, lack of versatility due to following available schedules, and physical burdens for example when luggage or extended waiting is involved.

Existing systems for public ground transportation for commuting involve similar challenges. The time-consuming aspects of commuting using public transportation usually affect commuting passengers on many or most work days. Commuters may travel at relatively early or late times to the possible detriment of their personal lives to avoid crowded, peak commuting times.

Because of challenges associated with public transportation, many travelers and commuters choose to utilize their personal vehicles to travel and commute instead of public transportation. This behavior causes traffic congestion, which often results in wasted time during travel. Further, the increased amount of vehicles using roadways causes increased pollution and carbon emission, which exacerbates detrimental effects to the environment and the harmful effects of climate change, ambient noise levels, and negatively affects roadway safety. The increased amount of vehicles using roadways also impacts people's social functioning due to the length of time spent in traffic (e.g., for people who do not own private vehicles). Some planned or implemented conventional rapid transportation methods involve a relatively small service area, compete with roadway surfaces that worsen congestion, have few stops, or present an accessibility challenge for getting to the station and from the station to a destination.

Accordingly, a need in the art currently exists for transportation systems and methods that address challenges in using existing transportation techniques. This need exists both for traveling long distances and for commuting.

The exemplary disclosed system, apparatus, and method of the present disclosure are directed to overcoming one or more of the shortcomings set forth above and/or other deficiencies in existing technology.

SUMMARY OF THE DISCLOSURE

In one exemplary aspect, the present disclosure is directed to a method. The method includes moving a vehicle having a plurality of wheels along a track, receiving a marker data or a marker signal from a marker at a location of the track using a reader of the vehicle, controlling a first rotational speed of a first wheel of the plurality of wheels at the location of the track based on the marker data or the marker signal, and controlling a second rotational speed of a second wheel of the plurality of wheels at the location of the track, independently of the first rotational speed, based on the marker data or the marker signal. The first rotational speed is different from the second rotational speed.

In another aspect, the present disclosure is directed to an apparatus for a vehicle having a plurality of wheels that moves along a track. The apparatus includes a marker configured to be disposed at a location of the track, a reader configured to be disposed at the vehicle, the reader configured to receive a marker data or a marker signal from the marker, and a controller configured to be disposed on the vehicle, the controller configured to control turning of the vehicle based on: controlling a first rotational speed of a first wheel of the plurality of wheels at the location of the track based on the marker data or the marker signal, and controlling a second rotational speed of a second wheel of the plurality of wheels at the location of the track, independently of the first rotational speed, based on the marker data or the marker signal. The first rotational speed is different from the second rotational speed.

BRIEF DESCRIPTION OF THE DRAWINGS

FIGS. 8A, 8B, and 8C illustrate an exemplary embodiment of a database of the present invention;

FIG. 15 is another schematic view of an exemplary embodiment of an exemplary system of the present invention;

FIG. 16A is another schematic view of an exemplary embodiment of an exemplary system of the present invention;

FIG. 16B is another schematic view of an exemplary embodiment of an exemplary system of the present invention;

FIGS. 18A and 18B are perspective views of an exemplary embodiment of the present invention;

DETAILED DESCRIPTION AND INDUSTRIAL APPLICABILITY

The exemplary disclosed system, apparatus, and method may include a transportation system such as a mass transit system (e.g., a public transportation system or a private transportation system). The exemplary disclosed transportation system may be a ground transportation system such as a public ground transportation system or a private ground transportation system. The exemplary disclosed system may include pathways or guideways (e.g., tracks, roads, or other suitable pathways) and stations (e.g., terminal locations and transfer locations) and may provide for and control the movement of a plurality of vehicles (e.g., many vehicles) along the pathways. The exemplary disclosed system may be a swift on-demand transportation system (e.g., ultralight transportation system). For example, the exemplary disclosed system may include a PRT (a Personal Rapid Transit system, e.g., having less than 4 riders per vehicle), a GRT (a Group Rapid Transit system, e.g., having about 10 or more riders), a private vehicle transporter system, and/or a pallet (e.g., loaded goods) transportation system.

Figure 1:
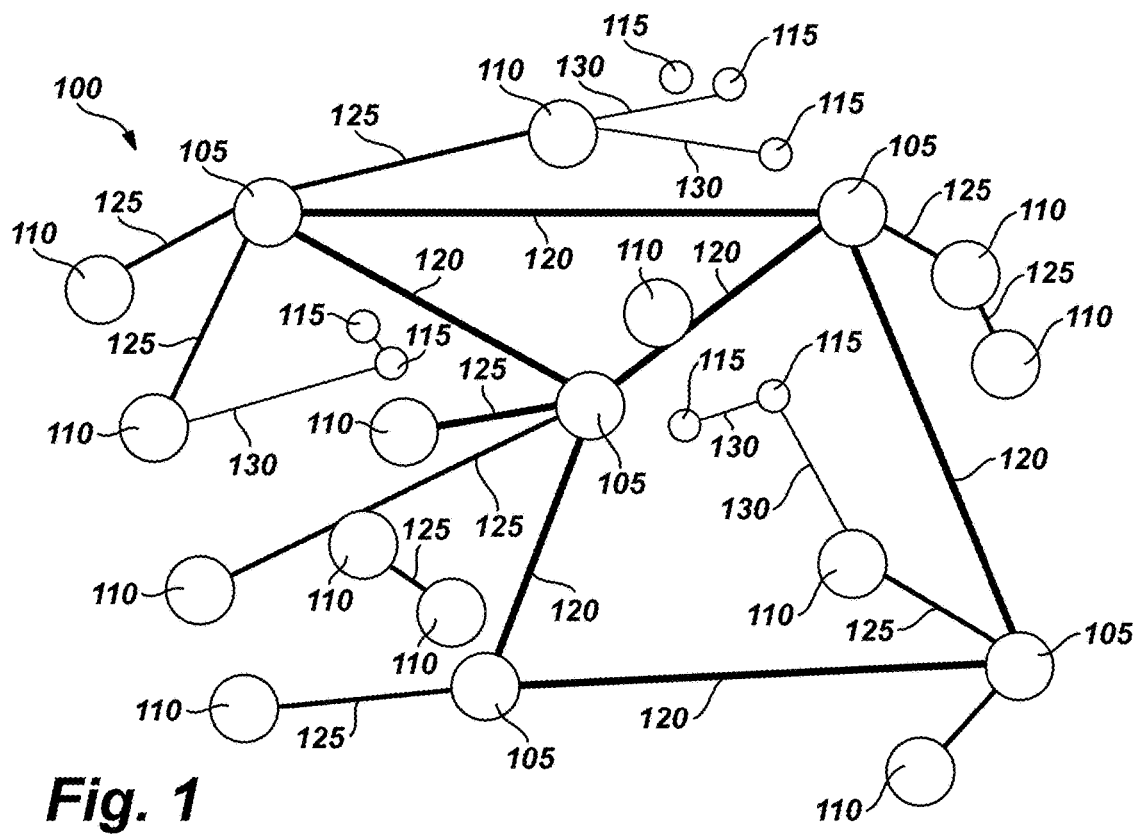
FIG. 1 is a schematic view of an exemplary embodiment of an exemplary system of the present invention.

FIG. 1 illustrates an exemplary disclosed transportation system 100 that may be a mass transit system. Transportation system 100 may be a public or private transportation system. Transportation system 100 may be a ground transportation system. In at least some exemplary embodiments, transportation system 100 may be a public ground transportation system.

Figure 3:
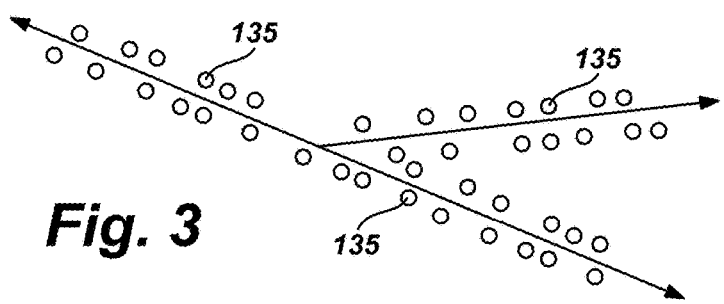
FIG. 3 is a schematic view of an exemplary embodiment of an exemplary system of the present invention.

Transportation system 100 may include one or more (e.g., a plurality of) hubs 105 (e.g., or terminals), one or more (e.g., a plurality of) parking centers 110, and/or one or more (e.g., a plurality of) stations 115. Transportation system 100 may also include one or more (e.g., a plurality of) trunk lines 120, one or more (e.g., a plurality of) primary branch lines 125, and/or one or more (e.g., a plurality of) secondary branch lines 130. Trunk lines 120 may connect hubs 105. Primary branch lines 125 may connect a given hub 105 with a given parking center 110, or may connect parking centers 110. Secondary branch lines 130 may connect a given parking center 110 with a given station 115, or may connect stations 115. In at least some exemplary embodiments, any of one or more hubs 105 (e.g., or terminals), parking centers 110, and/or stations 115 may be connected via any of trunk lines 120, primary branch lines 125, and/or secondary branch lines 130. As further described below and for example as illustrated in FIG. 3, a plurality of vehicles 135 may travel between one or more hubs 105, parking centers 110, and/or stations 115 via trunk lines 120, primary branch lines 125, and/or secondary branch lines 130. In at least some exemplary embodiments, parking centers 110 and/or stations 115 (e.g., and/or hubs 105 or terminals) may serve as trip start locations and/or trip end locations (e.g., passengers may begin and end trips at these locations).

Returning to FIG. 1, transportation system 100 may include a plurality of hubs 105 (e.g., several, up to ten, dozens or more hubs 105 or terminals) in a given region. Hubs 105 may serve as transfer (e.g., routing) hubs and/or terminals for accommodating large amounts of passengers (e.g., hundreds or thousands or more passengers). Hubs 105 may be transfer hubs that transfer vehicles 135 between different track lines (trunk lines 120, primary branch lines 125, and/or secondary branch lines 130) In at least some exemplary embodiments, hubs 105 (e.g., or terminals) may be large transportation stations that route many (e.g., thousands or more) vehicles 135. Although hubs 105 (e.g., or terminals) may serve as end points of transportation in some embodiments, vehicles 135 may pass through hubs 105 without passengers entering, exiting, or transferring between vehicles 135. For example in at least some exemplary embodiments, passengers may remain in a given vehicle 135 as it passes from a first trunk line 120 to a second trunk line 120 via a given hub 105. For example in at least some exemplary embodiments, transfer delays may not be involved in vehicles 135 passing through hubs 105 because passengers may remain in vehicles 135 while vehicles 135 remain in motion (e.g., may not stop) when passing through hubs 105. Transfer of passengers between vehicles 135 may thereby be prevented (e.g., while passing through hubs 105 and/or during an entire travel period and/or trip, except for example for medical emergencies, restroom breaks requested by passengers, and/or similar stops).

Figure 1A:
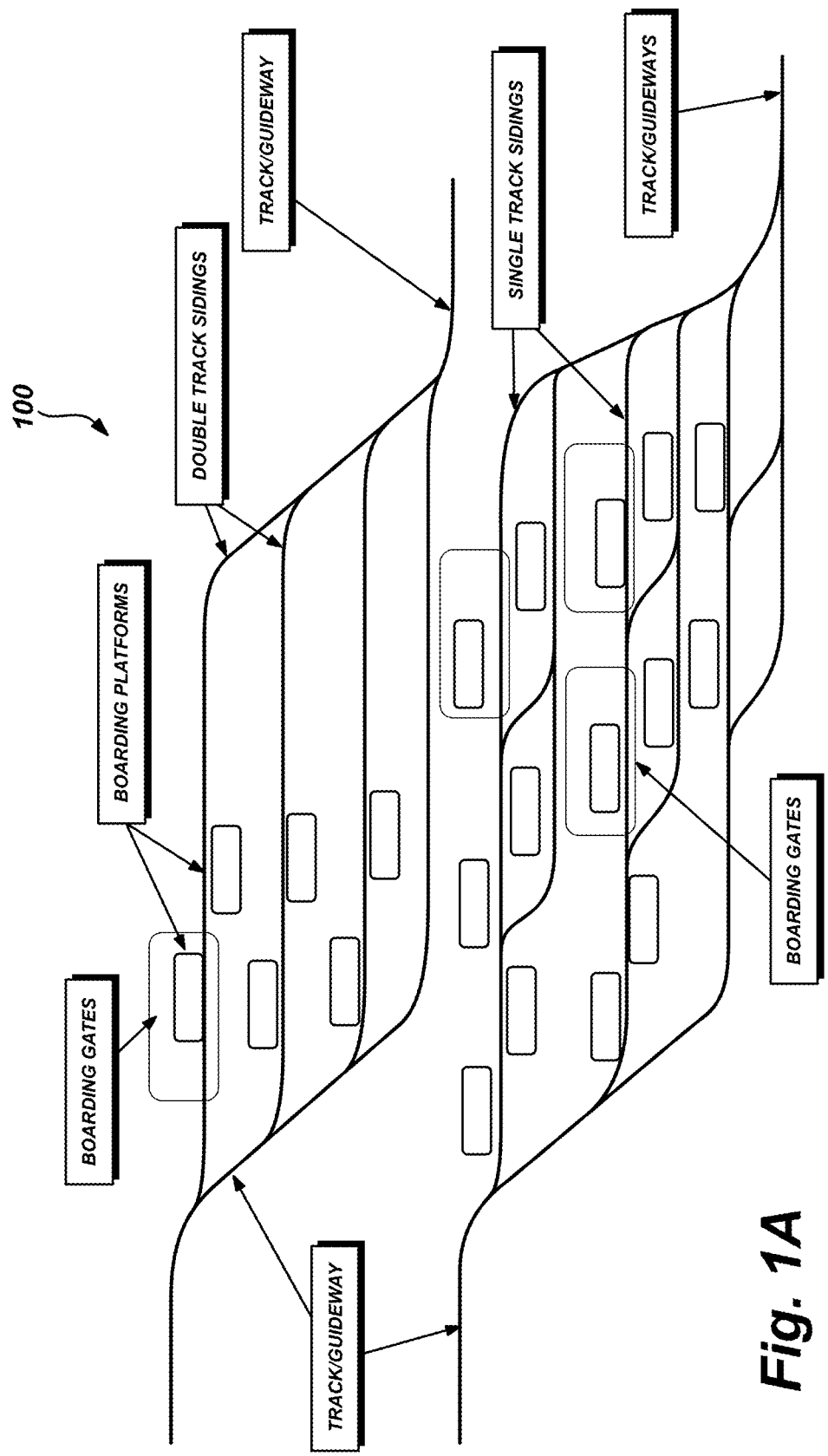
FIG. 1A is a schematic view of an exemplary embodiment of an exemplary system of the present invention.

FIG. 1A illustrates an exemplary embodiment of the exemplary disclosed system. For example, a station may be integrated into a parking center, terminal, or hub. In such an exemplary configuration, a vehicle may switch to a siding, and there may be designated platforms and/or gates for passenger on/off boarding. A platform may include multiple gates. A station may include multiple platforms. For example, a siding in each station may be where passengers on-board or off-board from the vehicle (e.g., this may be how on/off boarding occurs independently from fast moving vehicles in the tracks). For example, once a vehicle moves from an origin station, it may continue moving until arriving at the destination station regardless of a number of track switches and/or route changes. A vehicle may stop when the vehicle detects that a front vehicle (e.g., another vehicle in front of the vehicle) is stopped, which may be due to mechanical malfunction or in response to a passenger's change request (e.g. taking a bio break at a station before arriving at the destination, and/or other reasons instructed by the control center).

Returning to FIG. 1, a relatively large number of vehicles 135 may travel at relatively fast speeds between hubs 105 on trunk lines 120. For example, vehicles 135 may travel at speeds of between about 100 mph and about 120 mph on trunk lines 120 between hubs 105. In at least some exemplary embodiments, a vehicle 135 may approach a given hub 105 while traveling at a relatively fast speed on a first given trunk line 120, reduce speed when entering and being routed through hub 105 (e.g., making turns for example as described below), and then exit the given hub 105 on a second given trunk line 120 (e.g., or on the same first given trunk line 120) and increase speed after exiting hub 105. In at least some exemplary embodiments, passengers may remain in vehicles 135 as they continuously move through hub 105. For example, a relatively large number of vehicles 135 may continuously pass through and be routed via a given hub 105 (e.g., some, most, or substantially all without stopping) between trunk lines 120 connecting to the given hub 105. In at least some embodiments, the speed of vehicle 135 may be controlled by vehicle system 300, and when vehicle 135 passes an exemplary disclosed marker (e.g., as described below), it may use the marker identifier as a reference point to access the route database for a particular trip that contains data such as speed and turning information). Passengers may use the exemplary disclosed user devices and/or user interfaces to stop vehicle 135 if desired (e.g., to take a restroom break or a medical emergency). For example, hundreds or thousands or more vehicles 135 may be continuously moved through (e.g., routed through) a given hub 105 over any suitable time period (e.g., each hour).

Parking centers 110 may be any suitable center for passengers to enter and exit transportation system 100. For example, parking centers 110 may include parking areas (e.g., parking lots and/or parking garages) in which passengers may park their personal vehicles, bicycles, or depart from or board any other suitable vehicles before entering transportation system 100. Parking centers 110 may be located in suburban or rural areas, or may be located in urban areas such as city centers. Such types of facilities may be configured to load vehicle 135 (e.g., a private vehicle) onto a vehicle carriage pod if a passenger has reserved one. For example in at least some exemplary embodiments, vehicle 135 may be a private vehicle that may be loaded onto a vehicle (e.g., a carriage) such as a flatbed truck or other suitable work vehicle for example as described below (e.g., regarding FIG. 1B). The private vehicle may be loaded into the carriage pod while passengers (e.g., having the same destination) board the passenger pod to go to the same destination.

Stations 115 may be any suitable center for exiting and entering transportation system 100 at a desired location. Station 115 may for example include structures (e.g., platforms and stairways), passageways, and mechanical devices (e.g., escalators, elevators, and/or people movers) that may facilitate ingress and egress between vehicles 135 stopped at station 115 and entrance and exit locations (e.g., portals) of station 115. Hubs 105 and/or parking centers 110 may include similar features as stations 115. Stations 115 may be located at any suitable locations serviced by transportation system 100 such as, for example, airports, seaports, condo clusters, college campuses, town centers, hospitals, office buildings and office parks, recreational parks (e.g., amusement parks), residential complexes, shopping centers, tourist attractions, military bases, and/or any other suitable location.

Vehicles 135 may stop at parking centers 110 and/or stations 115 so that passengers may enter and exit transportation system 100. Also for example, vehicles 135 may remain moving when passing through parking centers 110 and/or stations 115 similarly to as described above regarding hubs 105. For example, vehicles 135 may be routed between trunk lines 120, primary branch lines 125, and/or secondary branch lines 130 via parking centers 110 and/or stations 115 (e.g., without stopping) similarly to as described above regarding hubs 105. Vehicles 135 may travel relatively slower using primary branch lines 125 as compared to trunk lines 120, and may travel relatively slower using secondary branch lines 130 as compared to primary branch lines 125. For example, vehicles 135 may travel at speeds of between about 100 mph and about 120 mph on trunk lines 120. Also for example, vehicles 135 may travel at speeds of between about 60 mph and about 75 mph on primary branch lines 125. Further for example, vehicles 135 may travel at speeds of between about 45 mph and about 60 mph on secondary branch lines 130. Trunk lines 120, primary branch lines 125, and secondary branch lines 130 may have a structure and may perform operations generally similar to as described below regarding the exemplary disclosed track and vehicle configurations. Vehicle 135 may decrease speed as it is entering the exemplary disclosed siding, for example slowing down gradually to a full stop. Vehicle 135 may gradually increase speed as it exits the exemplary disclosed siding to attain a speed generally matching other vehicles 135 on the track and before merging into the track. Vehicle 135 may communicate with other vehicles 135 within a defined range (e.g., any suitable distance such as several lengths of vehicle 135) to facilitate merging (e.g., negotiate the space so that vehicle 135 may merge in with other vehicles 135).

Figure 1B:
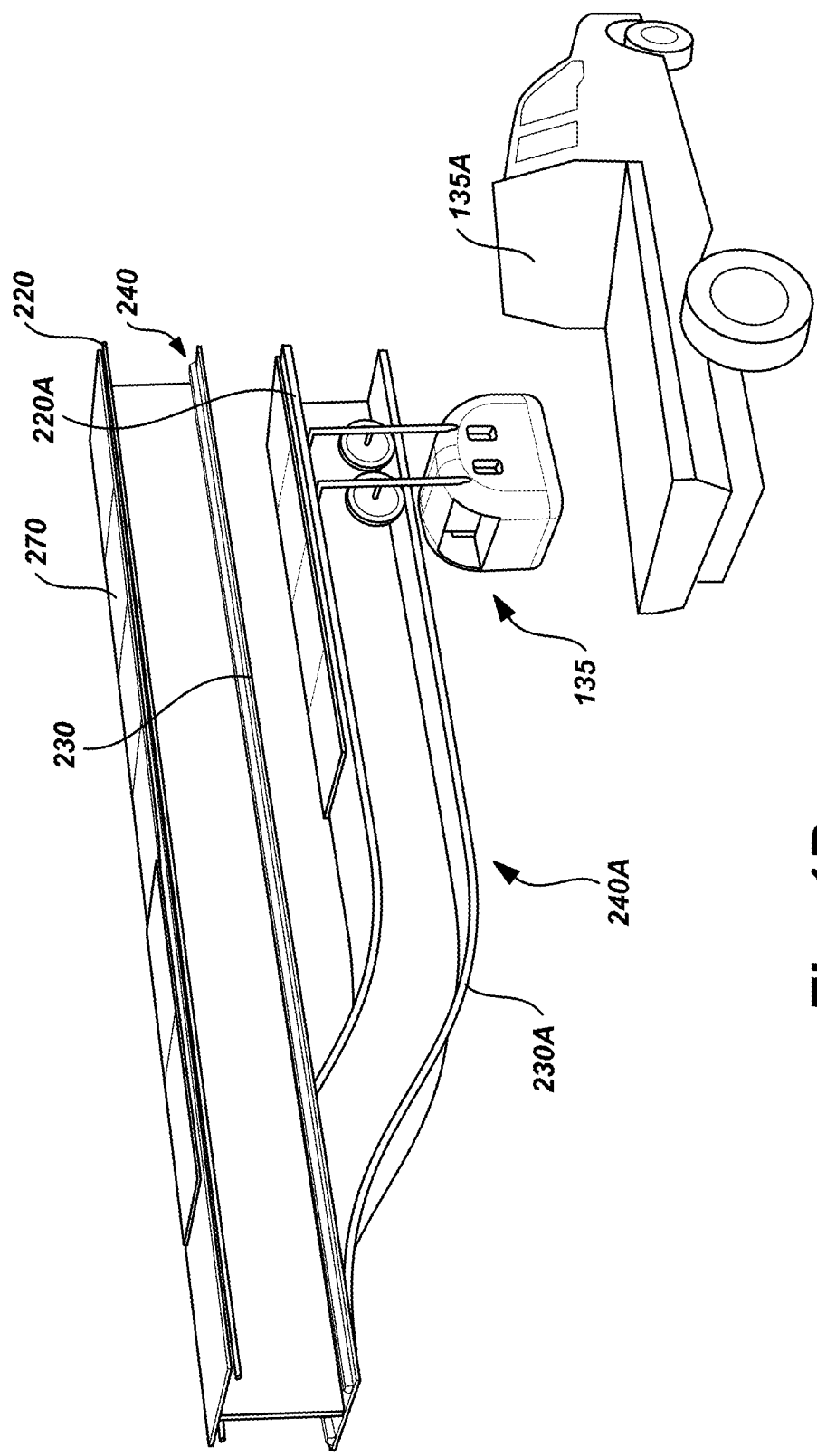
FIG. 1B is a schematic view of an exemplary embodiment of an exemplary system of the present invention.
Figure 4:
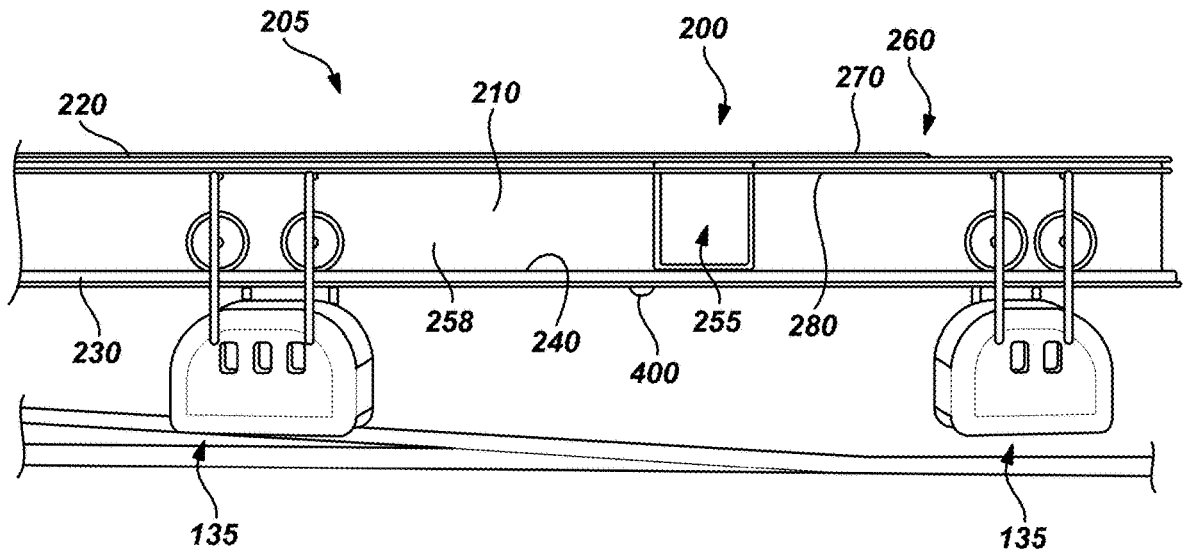
FIG. 4 is a side view of an exemplary embodiment of the present invention.

FIG. 1B illustrates an exemplary embodiment of the exemplary disclosed system. FIG. 1B illustrates a configuration for service and/or maintenance of vehicle 135 having a separate type of track configuration that allows a vehicle 135A such as a flatbed truck or other work vehicle to load and/or unload vehicle 135 (e.g., via a track assembly 240A having an upper flange 220A and a lower flange 230A). Track assembly 240A may thereby provide a service and/or maintenance track. Track assembly 240A may be configured to facilitate loading vehicle 135 onto vehicle 135A (e.g., a work vehicle such as a flatbed truck) for transporting vehicle 135 to a service shop. Track assembly 240A may also be configured to facilitate simple service that may be conducted on site (e.g., involving track power assembly 260 such as work on a graphite contact plate of a pantograph). In at least some exemplary embodiments, vehicle 135A may include lockable rollers and a winch installed on vehicle 135A to allow vehicle 135A to pull and/or lift vehicle 135 onto a surface such as a bed of vehicle 135A. Vehicle 135A may also include a push rod or similar mechanism for loading vehicle 135 onto track assembly 240A. Vehicle 135A may also be a combustion engine powered service vehicle that may locate a vehicle 135 to be repaired or serviced based on a GPS location (or other suitable location system communication) of vehicle 135.

Figure 2:
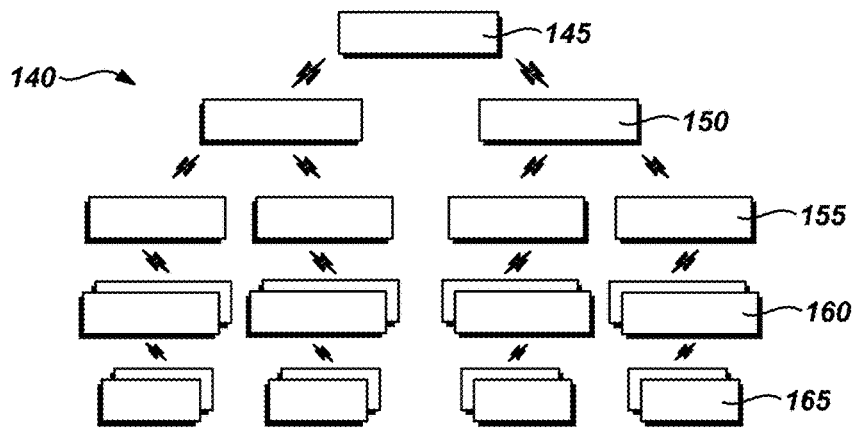
FIG. 2 is a schematic view of an exemplary embodiment of an exemplary system of the present invention.

As illustrated in FIG. 2, transportation system 100 may include a control system 140 for controlling operation at a national (e.g., or state) level, regional level, station level, line/track level, and/or vehicle level. Control system 140 may include a nation/state control system 145, a regional control system 150, a station control system 155, a line/track control system 160, and a vehicle control system 165. Nation/state control system 145 may control an operation of a plurality of regional control systems 150. Each regional control system 150 may control an operation of a plurality of station control systems 155 (e.g., of hubs 105, parking centers 110, and/or stations 115). Each station control system 155 (e.g., of one or more hubs 105, parking centers 110, and/or stations 115) may control (e.g., dispatch) vehicles 135, monitor vehicle 135 (e.g., a speed and maneuver of vehicle 135 for example as described below), control vehicles 135 to travel to a desired location (e.g., destination), a distance between vehicles 135, and/or any other suitable control actions of vehicles 135. Each line/track control system 160 may sense and provide data/signals of an identification, speed, direction, location, and/or other desired information of vehicles 135 to its station control systems 155 (e.g., based on an operation of the exemplary disclosed markers for example as described below). Each vehicle control system 165 may be integrated into corresponding vehicles 135 and may include components for example as described further below. For example, vehicle control system 165 may control a speed, location, direction, turning, distance to be maintained to nearby vehicles 135, interior compartment controls (e.g., HVAC for passenger comfort) of its vehicle 135, and/or any other suitable control operations. The various control systems of control system 140 may include control components and/or perform operations similar to as described below (e.g., exemplary disclosed control components of vehicles 135, the exemplary disclosed markers, controllers, databases, and/or networks described below).

For example, vehicle control system 165 may control a speed, location, direction, turning, and/or pacing speed of vehicle 135 relative to nearby vehicles 135 before and during merging of vehicle 135 onto the exemplary disclosed track assembly. Vehicle control system 165 may also control vehicle 135 to maintain a desired distance of headway to the front of vehicle 135, and conduct self-diagnostics of vehicle 135 while in operation (e.g., by comparing sound and vibration measurement with data stored in the on-board vehicle profile database). Vehicle control system 165 may also provide for measuring wheel rotation counts for the distance traveled to compare to mile marker distance, communicating with a monitoring center of line/track control system 160, and operating (e.g., turning on) the on-board video camera, speaker, and/or microphone when a passenger (e.g., rider) presses alert or SOS buttons. Vehicle control system 165 may also provide for executing route change orders from a line control center, transmitting route change to line/track control system 160 as ordered by a passenger, displaying a POD identifier such as an identifier of vehicle 135, accessing data of (e.g., read-up) a passenger's ticket confirmation code to unlock a door, checking a passenger's seating situation before locking the door and starting vehicle 135 movement, and/or accessing data of (e.g., read up of) mile markers and control of each wheel's speed accordingly.

FIGS. 4-9 illustrate an exemplary embodiment of an exemplary disclosed vehicle and track configuration of transportation system 100. For example, an intersection structure 200 may connect a plurality of track structures 205. Intersection structures 200 may be disposed in hub 105, parking center 110, station 115, and/or along any of trunk lines 120, primary branch lines 125, and/or secondary branch lines 130. Track structures 205 may be track structures of any of trunk lines 120, primary branch lines 125, and/or secondary branch lines 130.

As illustrated in FIGS. 4-9, the exemplary disclosed configuration (e.g., forming intersection structure 200 and/or track structures 205) may comprise a track and may include a structural assembly 210, a track assembly 240, and a track power assembly 260. Structural assembly 210 may structurally support track assembly 240, track power assembly 260, and vehicles 135. Track assembly 240 may guide a movement of vehicles 135, and track power assembly 260 may provide power to vehicles 135. The exemplary disclosed configuration may include one or more power rails as described herein (e.g., an assembly that brings electricity from overhead conductor to the vehicle's motor). For example, a pantograph having structure that can extend or shrink slightly (e.g., based on the overhead line) may be included.

Structural assembly 210 may be any suitable structural assembly for supporting track assembly 240, track power assembly 260, and vehicles 135. Structural assembly 210 may include a plurality of structural shapes such as, for example, I-Beams, H-Beams, channels, tee beams, double tee beams, and/or built-up members (e.g., formed from plate members and/or structural shapes). Members of structural assembly 210 may be attached together via any suitable attachment technique such as, for example, welding, bolting, and/or any other suitable attachment technique (e.g., mechanical attachment technique). Structural assembly 210 may be supported by any suitable substructure structural components such as, for example, foundations (e.g., piers and abutments), columns, and/or any other suitable substructure elements. For example, structural assembly 210 may include a superstructure supported along substructure elements to form an elevated track. Structural assembly 210 may also include portions supported directly on a ground surface supporting structural assembly 210. Structural assembly 210 may be formed from any suitable structural materials such as structural steel, prestressed concrete, reinforced concrete, composite materials, and/or any other suitable structural materials. As illustrated in FIGS. 4-9, components of track assembly 240 and/or track power assembly 260 may be supported at an upper flange 220 and/or a lower flange 230 of structural assembly 210. For example, solar power collectors 270 may be solar panels, and one or more power rails 280 may be power rails that provide electricity to a hub-mounted electric motor of vehicle 135 to drive vehicle 135.

Structural assemblies 210 may be located above, below, and/or in the vicinity of other transportation systems (e.g., existing or new transportation systems). For example, structural assemblies 210 may be built above or below existing or new roadways and/or railways (e.g., with substructure elements supported in median areas and/or other areas of a roadway not used by vehicular traffic). Accordingly, little or no additional land or space further to that already used by other transportation systems may be used or taken up by transportation system 100. Transportation system 100 may thereby add capacity to other and/or existing transportation systems without interfering with transportation provided by those systems (e.g., without interference with ground situations such as flooding, fallen trees, and/or road debris).

Figure 5:
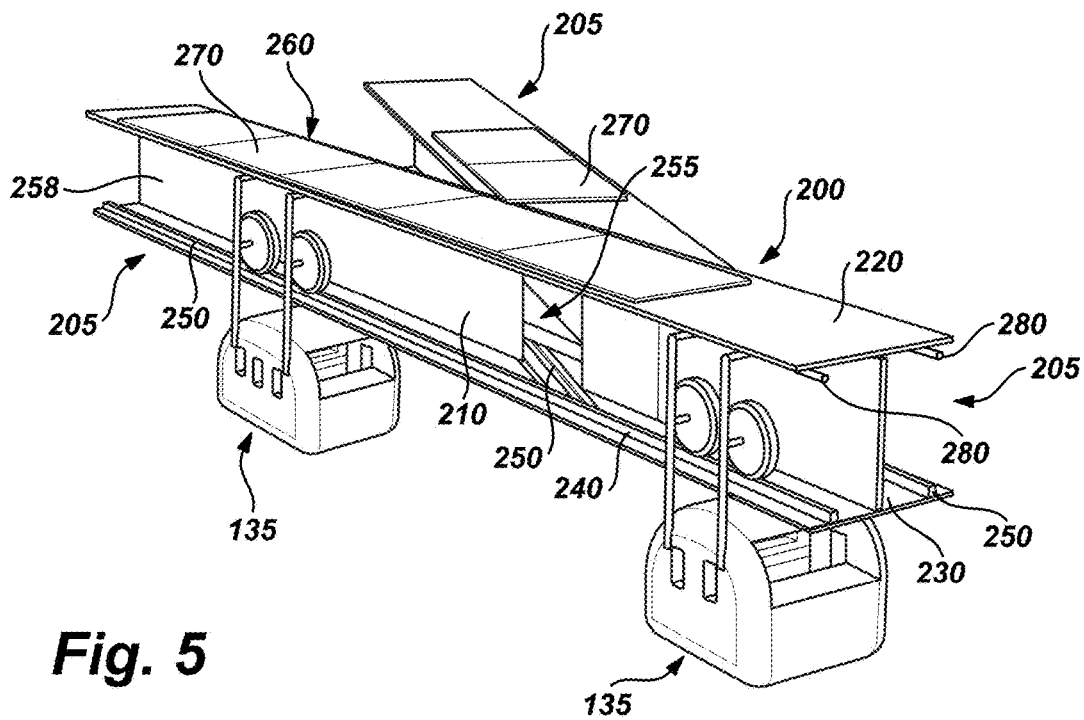
FIG. 5 is a perspective view of an exemplary embodiment of the present invention.
Figure 5A:
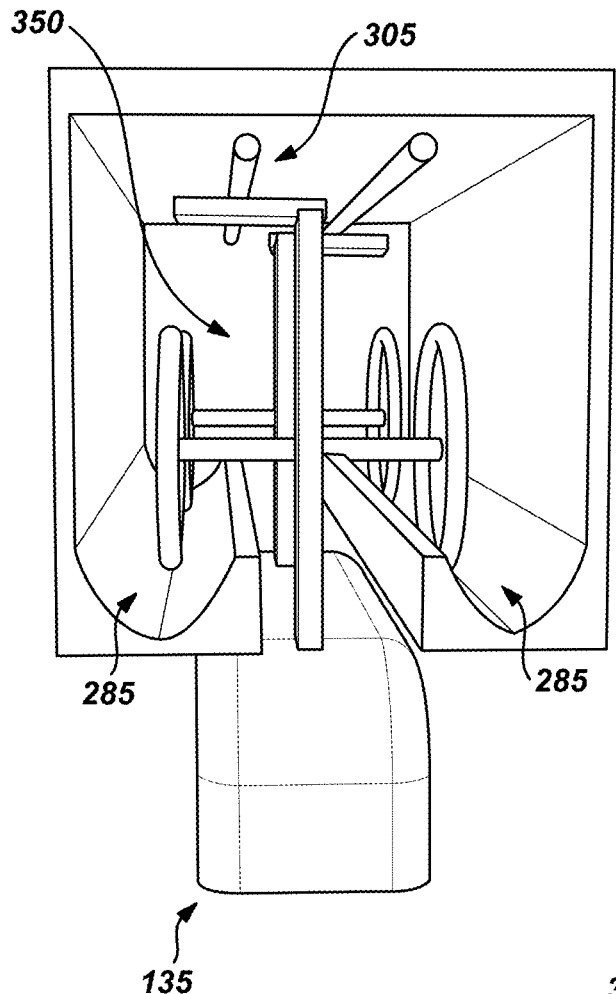
FIG. 5A is another perspective view of an exemplary embodiment of the present invention.
Figure 5B:
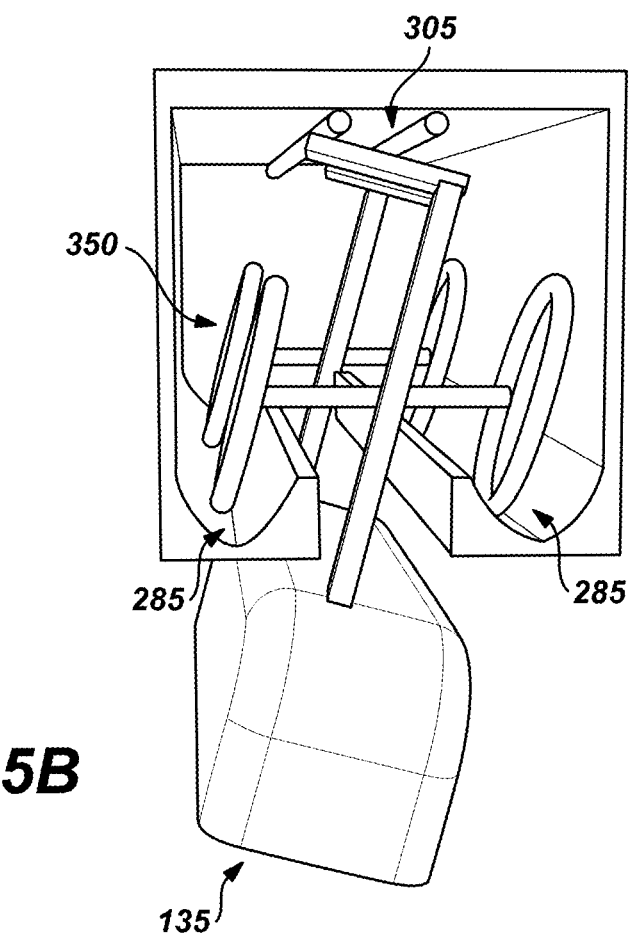
FIG. 5B is another perspective view of an exemplary embodiment of the present invention.
Figure 6:
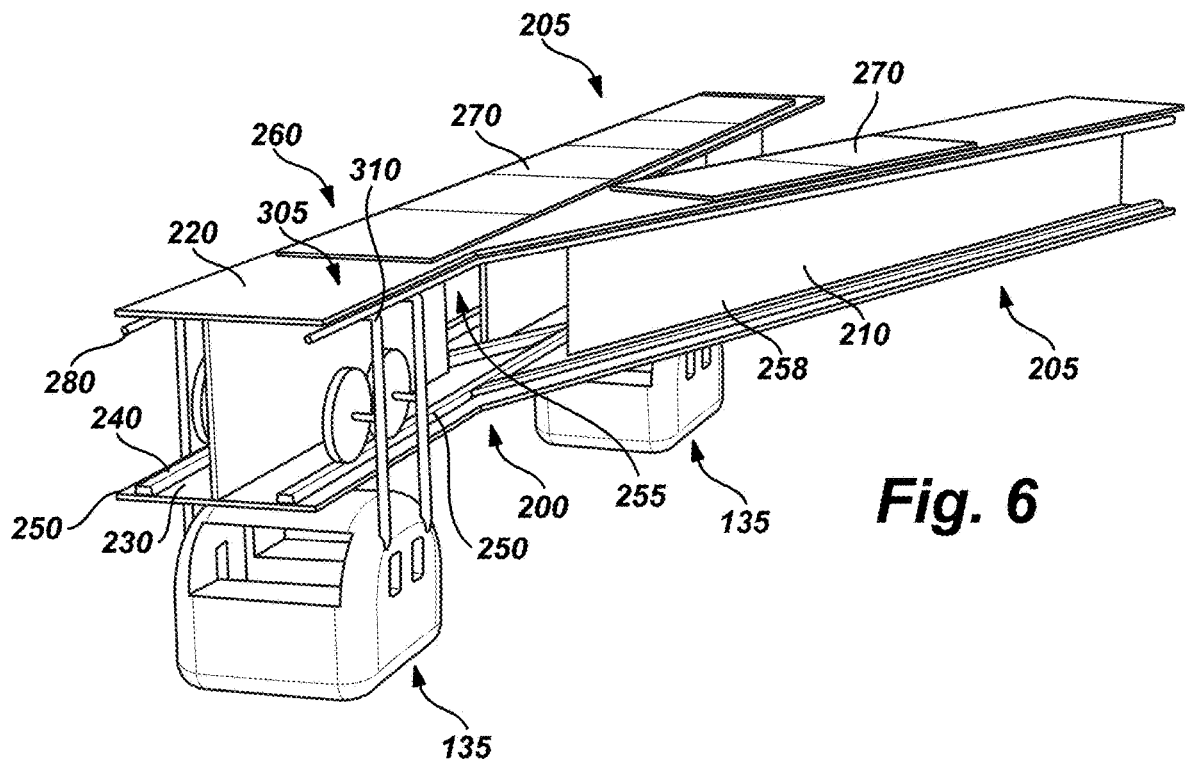
FIG. 6 is another perspective view of an exemplary embodiment of the present invention.
Figure 8:
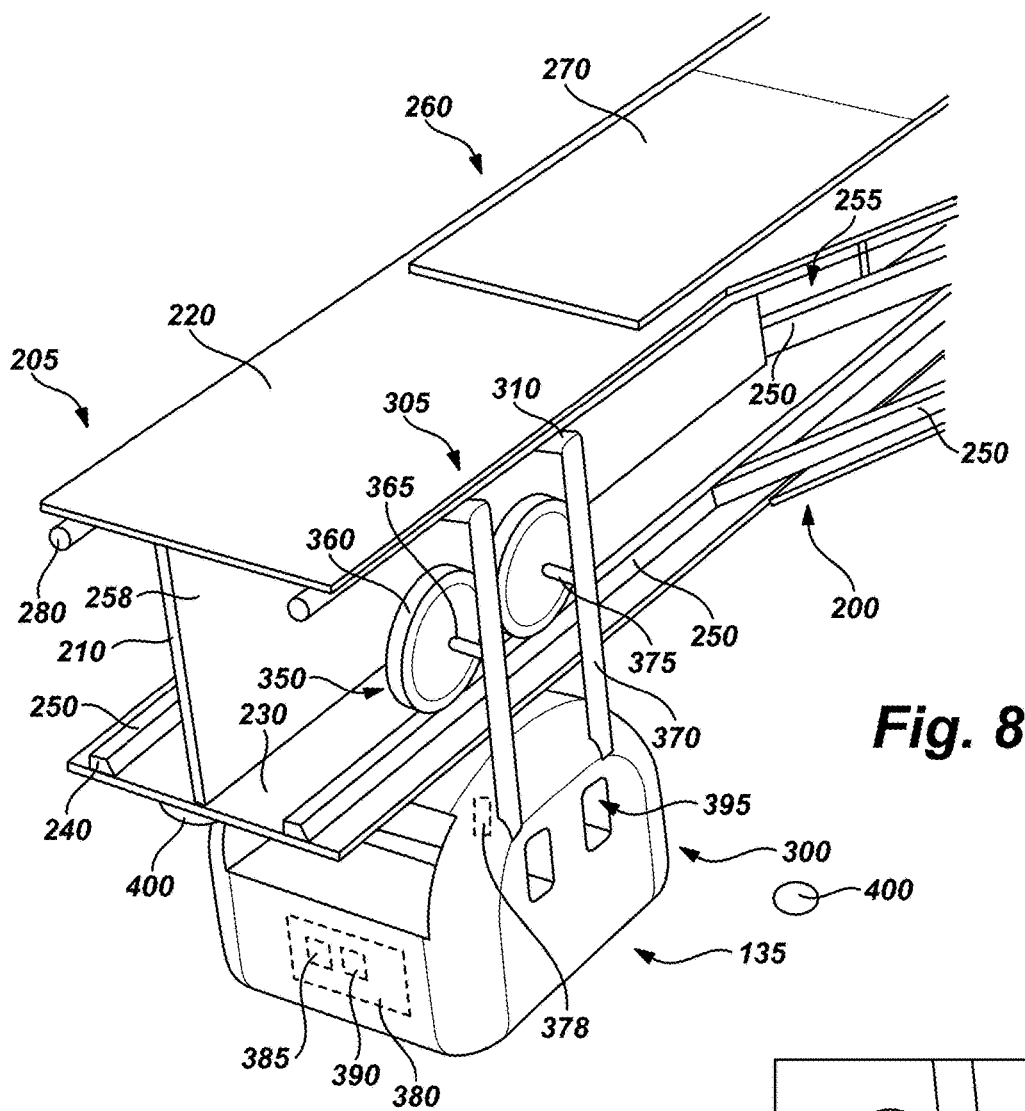
FIG. 8 is another perspective view of an exemplary embodiment of the present invention.

Track assembly 240 may be any suitable assembly for supporting and/or guiding vehicles 135. As illustrated in FIGS. 5, 6, and 8, track assembly 240 may include track guide members 250 that may extend along a longitudinal length of structural assembly 210. Track guide members 250 may be formed from material similar to structural assembly 210 for example as described above. Track guide member 250 may be flat on a bottom portion where a wheel of vehicle 135 runs when the track is in a straight line. The exemplary disclosed track guide (e.g., track guide member 250) may be inclined towards an outer edge (e.g., either in a straight slope or in a curvature slope shape). For example, this raised edge (e.g., as illustrated in FIGS. 5A and 5B) may function as a super elevation to counter centrifugal force when vehicle 135 is making turns. For example, track guide members 250 may be structural members such as H-beams, channels, tee beams, double tee beams, I-beams, or any other structural member or built-up members that may be attached to an upper surface of lower flange 230 (and/or any other suitable location) via any suitable technique such as welding, bolting, and/or any other suitable attachment technique (e.g., mechanical attachment technique). Track guide members 250 may be configured to receive, support, and/or guide components of vehicles 135 for example as described below. For example as illustrated in FIGS. 5A and 5B, the cross section of the exemplary disclosed track may have a curving slope or a straight slope surface raised towards a vertical edge (e.g., and may include a flat portion, for example on the horizonal). For example, the exemplary disclosed track may include a U-shaped portion 285 for supporting wheels 360 for example as illustrated in FIGS. 5A and 5B. The cross section may allow for a wheel of vehicle 135 to counter potential vibrations (e.g., to stay on the flat portion of the track when going straight), and to oppose centrifugal force when vehicle 135 is making turns. That is, the exemplary disclosed slope may be to counter the linear forward momentum when vehicle 135 is turning (e.g., or when vehicle 135 has small vibrations).

Further to as described above, FIGS. 5A and 5B illustrate an alternative embodiment of the exemplary disclosed track structure. As illustrated in FIGS. 5A and 5B, the curving superelevation may be either straight (e.g., a straight line) or curved. FIGS. 5A and 5B illustrate a perspective front view of an alternative track structure having a web on both outer walls. The exemplary disclosed solar panels may remain on the exemplary disclosed top flange. The curve on the slope of the track (e.g., at U-shaped portion 285) may be either a straight-line slope or a slope having curvature (e.g., a curvature slopes). There may be linkages (e.g., hinges) on the exemplary disclosed pantograph.

Figure 5C:
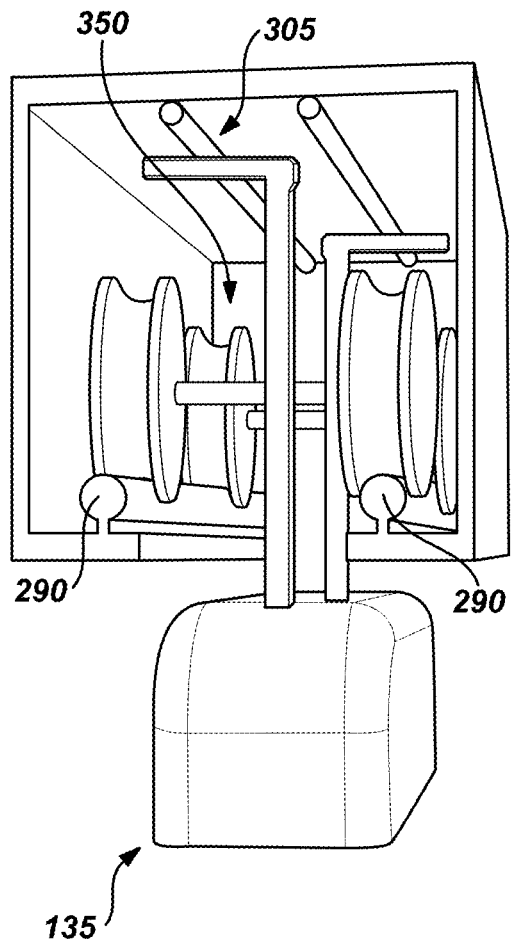
FIG. 5C is another perspective view of an exemplary embodiment of the present invention.
Figure 5D:
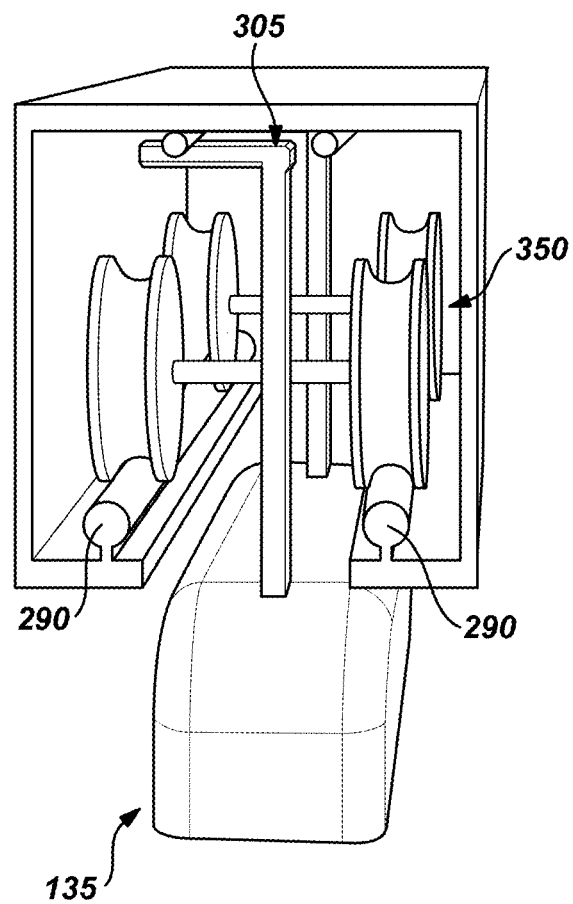
FIG. 5D is another perspective view of an exemplary embodiment of the present invention.

FIGS. 5C and 5D illustrate another alternative embodiment of the exemplary disclosed track structure. As illustrated in FIGS. 5C and 5D, one or more rod portions 290 may guide wheels 360 (e.g., that may be configured to receive rod portions 290 for example as illustrated in FIGS. 5C and 5D) and provide anti-centrifugal force (e.g., similar to a purpose of U-shaped portions 285). For example, a groove at a center portion of wheel 360 may receive rod portion 290 that may be rounded. When vehicle 135 banks to the side (e.g., turning to the right), wheels 360 and vehicle 135 may lean (e.g., lean to the right), and a top-right side of the exemplary disclosed track may absorb or take this force to keep vehicle 135 moving in the proper direction.

For example as illustrated in FIGS. 5, 6, and 8, some track guide members 250 may be disposed at an angle to adjacent track guide members 250. Track guide members 250 may extend through openings 255 formed in structural assembly 210. Openings 255 may be openings formed in a web plate 258 attached between upper flange 220 and lower flange 230 of structural assembly 210, track guide member 250, and lower flange 230. For example, a given track guide member 250 may be attached to an upper surface of lower flange 230 and may extend through a given opening 255 formed in a given web plate 258 (or between web plates 258), track guide member 250, and lower flange 230. For example, components of vehicle power assembly 305 may pass through opening 255. Vehicles 135 may be guided via track guide members 250 and may pass through openings 255 when turning for example as described further below.

Track power assembly 260 may be supported by (e.g., attached to) structural assembly 210. Track power assembly 260 may include a plurality of solar power collectors 270 and a plurality of power rails 280. Solar power collectors 270 may be electrically connected to power rails 280.

Solar power collectors 270 may be any suitable component for collecting solar energy. Alternatively for example, any other suitable power source (e.g., renewable energy source and/or non-renewable energy source) may be used to provide power to power rails 280. In at least some exemplary embodiments, power rails 280 are electrically connected to external power sources such as a power grid. In at least some exemplary embodiments, solar power collectors 270 may include solar panels. Solar power collectors 270 may include any suitable photovoltaic components (e.g., cells). Solar power collectors 270 may be any suitable type of solar energy collectors such as, for example, polycrystalline silicon panels, thin film panels, and/or monocrystalline silicon panels. Solar power collectors 270 may be supported at (e.g., attached to) upper flanges 220 of structural assembly 210. For example, solar power collectors 270 may be disposed on an upper surface of upper flange 220 to collect solar energy. In at least some exemplary embodiments, transportation system 100 may be primarily or substantially entirely solar-powered during at least certain operational time periods (e.g., at least at some times during operation).

In at least some exemplary embodiments, solar power collectors 270 may be adjustable (e.g., rotatable or tiltable) to increase collection efficiency (e.g., to optimize or maximize an amount of solar energy collected). For example, a position (e.g., rotation or tilt) of solar power collectors 270 may be adjusted based on a geographic location of solar power collectors 270. For example, as the location of solar power collector 270 moves further north from the equator, a tilt (e.g. inclination) of solar power collector 270 facing south toward the equator may increase (e.g., and vice versa when south of the equator). Solar power collector 270 may include any suitable motor for adjusting tilt such as the exemplary motor types described herein. Location information (e.g., global positioning data) may be provided to the exemplary disclosed control system (e.g., control system 140 and/or as further described below) so that transportation system 100 may operate to control a tilt angle of a given solar power collector 270 based on its geographic location or by using a sun tracking mechanism to automatically tilt solar power collector 270 to remain directly facing the sun throughout the day. Solar power collectors 270 may also be disposed on vehicles 135 and/or any other suitable locations of transportation system 100.

Power rails 280 may be any suitable members for transferring power generated by solar power collectors 270 and/or power from a power grid. For example, if power rail 280 is tied to a power grid, power rail 280 may become an integral part of the large power system. Power rails 280 may be any suitable type of current conductor. Power rails 280 may be electrically connected to solar power collectors 270 and may transfer electrical power to vehicles 135 and/or external power sources (e.g., transfer electrical power generated by solar power collectors 270 to the power grid). Power rails 280 may be attached to upper flange 220 and may extend along a longitudinal direction of structural assembly 210. For example, power rails 280 may be attached to a bottom surface of upper flanges 220. Power rails 280 may include and/or be electrically connected to pantographs (e.g., or power rail 280 and/or vehicle 135). Power rails 280 may electrically connect to vehicles 135 via any suitable technique such as, for example, to a component of vehicle 135 as described below.

Vehicle 135 may be any suitable vehicle for traveling on structural assembly 210 of trunk line 120, primary branch line 125, and secondary branch line 130. Vehicle 135 may be a ground vehicle having wheels, tires, and/or tracks that may engage with, be supported by, and/or be guided by track guide members 250. Vehicle 135 may be a mini-car. For example, vehicle 135 may be a small capacity mini-car (e.g., a PODcar). In at least some exemplary embodiments, vehicles 135 may be mini-cars having any suitable capacity (e.g., 2, 4, 6, 8, and/or 12 seats) with or without luggage and/or bicycle transport capacity, a carriage platform for private car, and/or a pallet or crate shipping container for goods. Vehicles 135 may be autonomous vehicles that may be controlled by vehicle control system 165. Vehicle 135 may be configured to receive and transport passengers having physical disabilities. Vehicle 135 may be a relatively lightweight vehicle (e.g., weighing under 2,000 lbs. for a 2 seat configuration).

Vehicle 135 may be powered by any suitable technique. Vehicle 135 may be powered by renewable and/or non-renewable energy sources. For example, vehicle 135 may be an electric vehicle. Vehicle 135 may be a solar-powered vehicle for example as described below. In at least some exemplary embodiments, vehicle 135 may be an electric vehicle powered by solar energy collected by solar power connectors 270 via power rails 280.

In at least some exemplary embodiments, vehicle 135 may have similar (e.g., the same) configuration (e.g., aerodynamic configuration) at the front and the rear so that vehicle 135 may move with the same characteristics in both directions (e.g., both forward and backward). Vehicle 135 may be provided in any suitable configuration such as, for example, a configuration providing for passengers, a configuration providing for passengers and trunk space, a compact car carriage platform, and/or any other suitable configuration.

Figure 7:
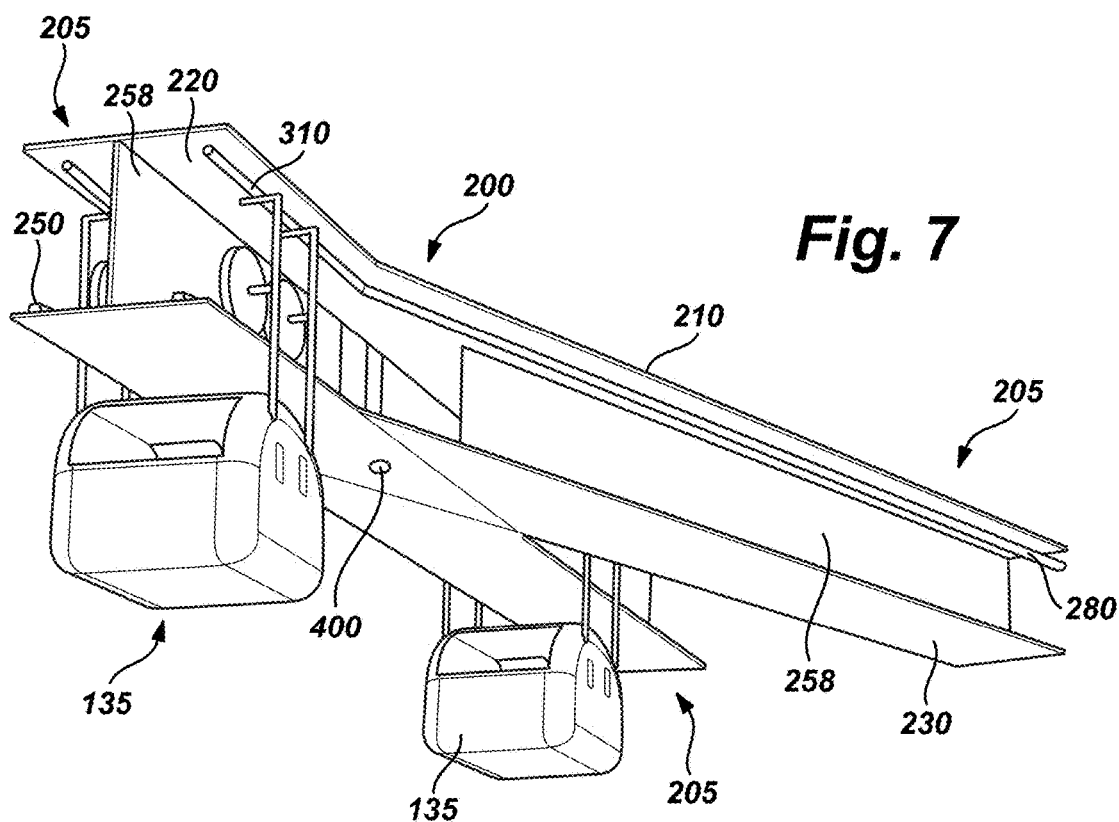
FIG. 7 is another perspective view of an exemplary embodiment of the present invention.

For example as illustrated in FIGS. 7 and 8, vehicle 135 may include a vehicle system 300. Vehicle system 300 may include a vehicle power assembly 305, a vehicle drive assembly 350, and a vehicle control assembly 380. Vehicle power assembly 305 may power vehicle drive assembly 350 and vehicle control assembly 380.

Vehicle power assembly 305 may include one or more (e.g., a plurality of) power transfer members 310 that may transfer power from power rails 280 to vehicle drive assembly 350. Power transfer member 310 may be any suitable member for transferring electrical current and/or voltage. Power transfer member 310 may for example have a bent and/or angled end portion that may be disposed near and/or in contact with power rails 280 so that power transfer member 310 may be electrically connected to power rails 280. Power transfer member 310 may extend from near power rails 280 to vehicle drive assembly 350. One or more power transfer members 310 may include one or more electrical connectors (e.g., electrical wires) that may form a complete electrical circuit with vehicle drive assembly 350 so that energy (e.g., voltage and/or current) provided by power rails 280 may power vehicle drive assembly 350 via power transfer members 310.

Vehicle drive assembly 350 may include a plurality of wheels 360 and motors 365. Motors 365 may be integrated into wheels 360. Power transfer member 310, motor 365, and wheel 360 may be integrated into a structural power assembly 370 that may be rotatably attached to wheel 360, may partially or entirely contain power transfer member 310, and/or may structurally support vehicle 135 from structural assembly 210 via attachment to wheel 360 (e.g., structural power assemblies 370 may structurally attach components of vehicles 135 to wheels 360). Motor 365 may be an electric motor. Motor 365 may be a servo motor, a stepper motor, a brushless motor, or any other suitable type of motor. Motor 365 may be disposed at a center of wheel 360. For example, wheel 360 and motor 365 may form a hub motor drive wheel having motor 365 (e.g., electric driving motor) disposed at a center of wheel 360. A rotation of wheel 360 may be set to a maximum rotation of any suitable amount (e.g., +/−15 degrees) based on the exemplary disclosed rotatable assembly described below.

Wheel 360 may have a specific caster angle to the vehicle's frame/body structure. Wheel 360 may return to a straight configuration (e.g., be aligned straight forward) when vehicle 135 is not being controlled to turn. For example, centripetal force acting on wheel 360 may cause wheel 360 to return (e.g., naturally return) to a straight configuration or position. Motor 365 may be disposed (e.g., installed) at the center of wheel 360 that may be a caster.

Figure 9A:
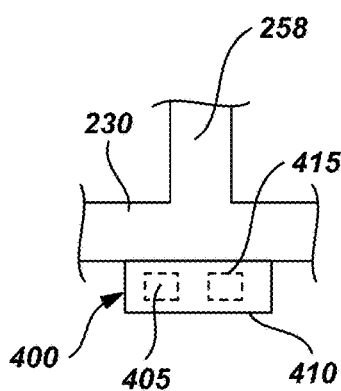
FIG. 9A is another detailed perspective view of the exemplary embodiment of FIG. 8.
Figure 9:
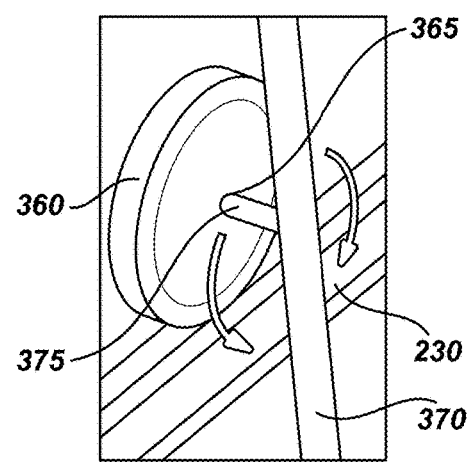
FIG. 9 is a detailed perspective view of the exemplary embodiment of FIG. 8.
Figure 10:
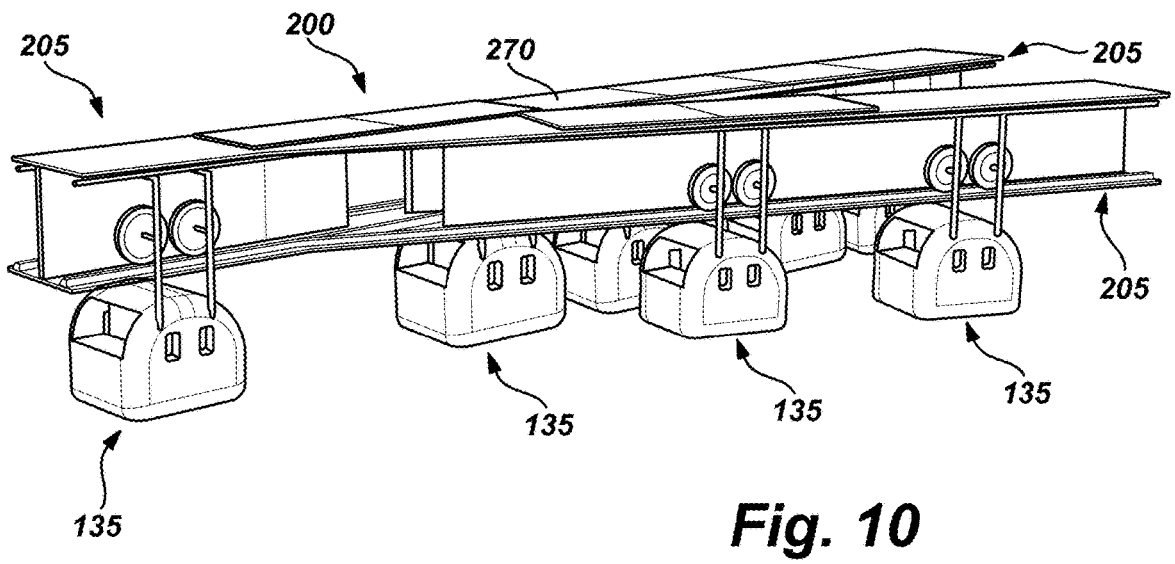
FIG. 10 is a perspective view of an exemplary embodiment of the present invention.
Figure 11:
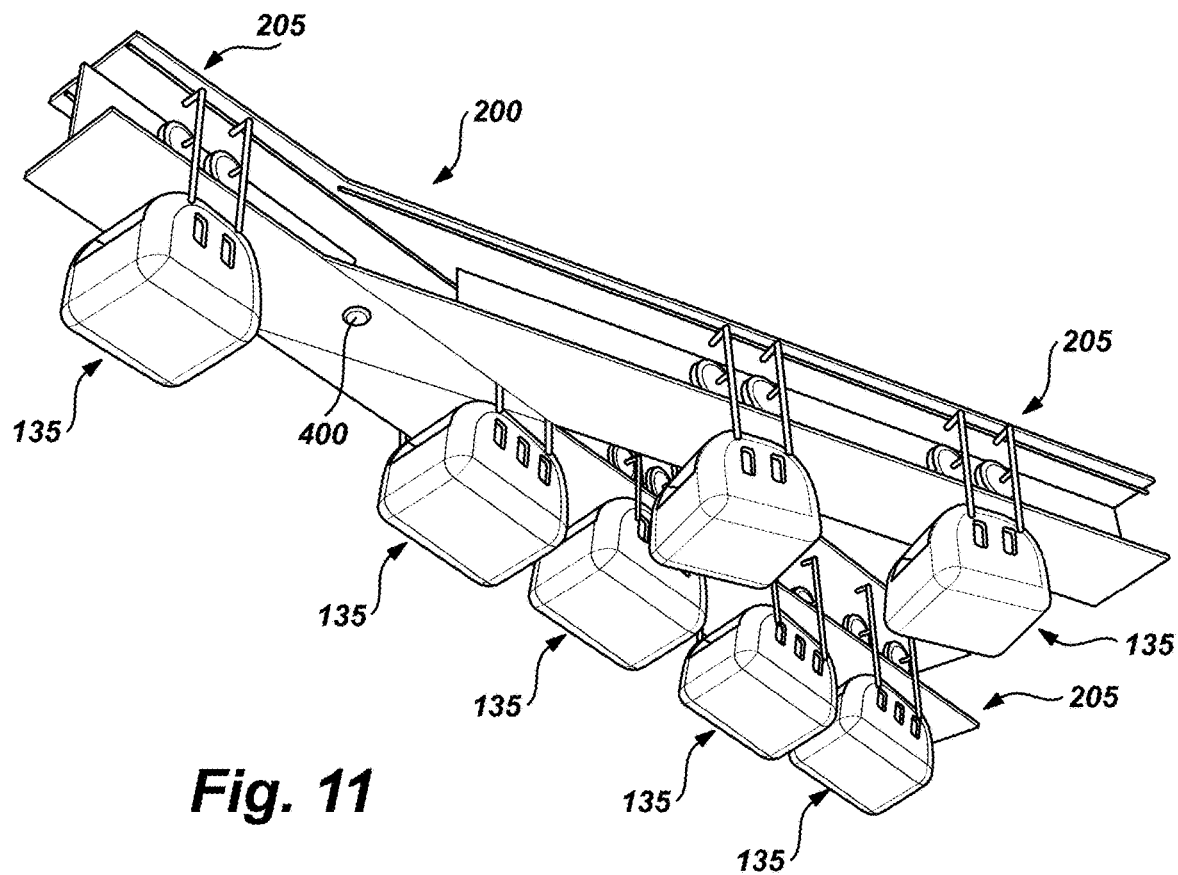
FIG. 11 is another perspective view of an exemplary embodiment of the present invention.
Figure 12:
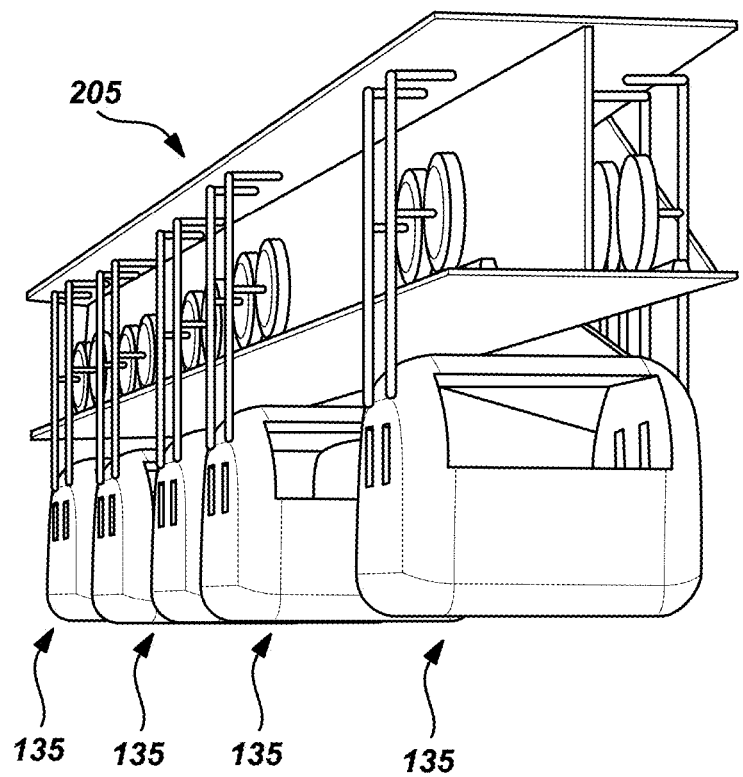
FIG. 12 is another perspective view of an exemplary embodiment of the present invention.
Figure 13:
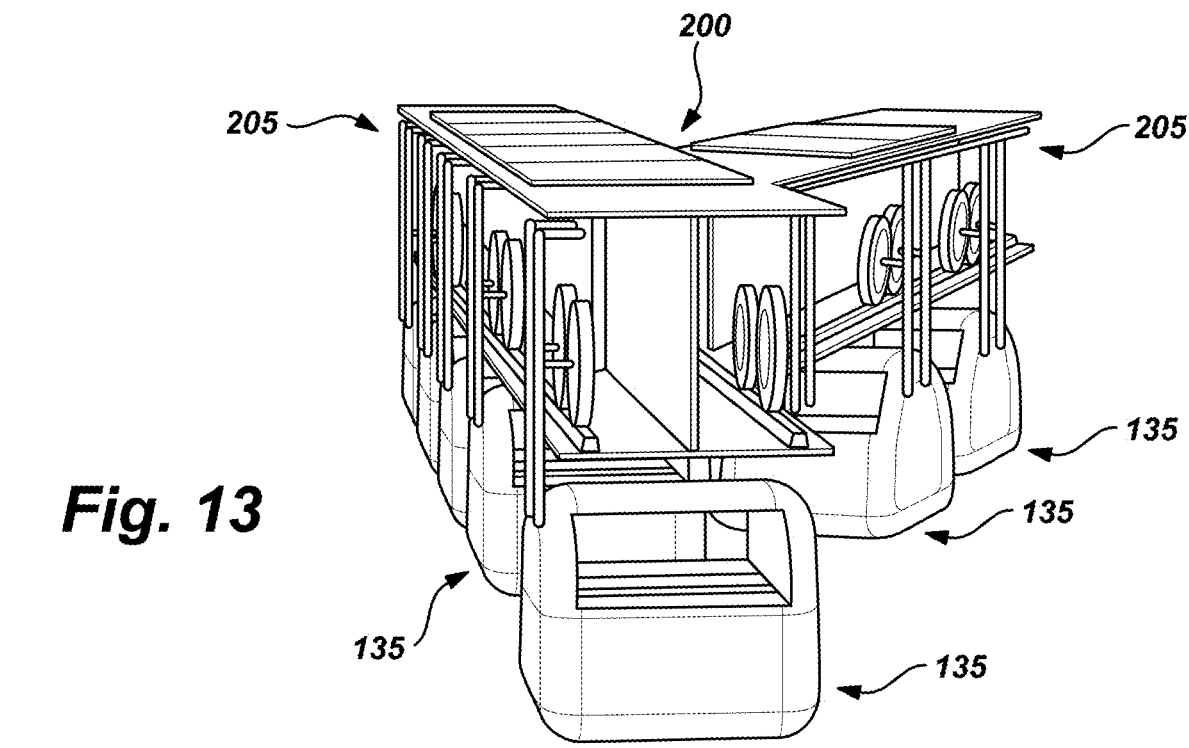
FIG. 13 is another perspective view of an exemplary embodiment of the present invention.

As illustrated in FIGS. 8 and 9, structural power assembly 370 may be attached to wheel 360 via a rotatable assembly 375. Energy (e.g., voltage and/or current) provided by power rails 280 via power transfer members 310 (e.g., and structural power assembly 370) may power motor 365 to drive (e.g., rotate) wheel 360. Rotatable assembly 375 may also include one or more motors that may drive a rotation of wheel 360 as illustrated for example in FIG. 9 (e.g., rotation of wheel 360 via rotatable assembly 375 about an axis such as a vertical axis), with the motors of rotatable assembly 375 being powered by energy of power rails 280 via power transfer members 310 (e.g., and structural power assembly 370). Wheels 360 may be operably connected to a steering mechanism of vehicle system 300 (e.g., a power steering mechanism). Alternatively for example, wheels 360 may be rotatable (e.g., freely rotatable about a vertical axis) via rotatable assembly 375 without rotatable assembly 375 including motors. Rotatable assembly 375 may include one or more hinges and/or other rotational mechanisms for providing rotation of wheel 360. Some or each of a plurality of wheels 360 may be powered (e.g., driven) by respective motors 365 using a different amount of power from power rails 280 via power transfer members 310 (e.g., and structural power assembly 370) so that the wheels 360 turn at varying speeds. This may allow for turning of vehicle 135 for example as described further below.

For example as illustrated in FIG. 8, vehicle drive assembly 350 may also include a battery 378 that may be supplied with power from power rails 280 via power transfer members 310 (e.g., and structural power assembly 370). Battery 378 may be a nickel-metal hydride battery, a lithium-ion battery, an ultracapacitor battery, a lead-acid battery, a nickel cadmium battery, or any other suitable type of battery. Battery 378 may store energy that may be provided from battery 378 to vehicle drive assembly 350 and vehicle control assembly 380 when power from power rails 280 may not be available. Battery 378 may be used to power vehicle 135 in the event of a brief moment of power interruption or failure.

As illustrated in FIG. 8, vehicle control assembly 380 may include a controller 385 and a reader 390. Controller 385 may be similar for example to the exemplary disclosed controllers described below regarding FIG. 14. Reader 390 may be an RFID reader (e.g., low frequency RFID, high frequency RFID reader, or ultra-high frequency RFID reader). Reader 390 may include Near Field Communication, Bluetooth low energy, RFID, and/or any other suitable communication components. In at least some exemplary embodiments, reader 390 may be an active type reader that has read/write and/or transmit/receiving capabilities. Alternatively, reader 390 may energize a given exemplary disclosed marker to obtain a unique identification of the given exemplary disclosed marker.

Returning to FIG. 8, controller 385 may control a speed and/or direction of rotation of each wheel 360 based on data and/or signals received by controller 385 (e.g., in conjunction with an onboard database) for example as described below. Controller 385 may receive input and provide output to passengers via a passenger interface 395 that may be located in vehicle 135. Any suitable information may be provided to passengers via passenger interface 395 such as, for example, geographic-based information (e.g., geo-targeting information services). Passenger interface 395 may be any suitable user interface similar for example to the exemplary disclosed user device (e.g., user interface) described below regarding FIG. 14.

FIGS. 8A through 8C illustrate an exemplary embodiment of the exemplary disclosed onboard database. For example, controller 385 may control vehicle 135 based on the exemplary disclosed onboard database.

Vehicle 135 may have GPS capabilities (e.g., and/or any other suitable location system as described further below) and/or satellite communication capabilities. In the event of vehicle 135 losing power or having a serious failure, vehicle 135 may report its location to the exemplary disclosed line control system (e.g., for dispatching emergency response team to vehicle 135 based on the reported GPS coordination or coordination based on any suitable location system).

Returning to FIG. 8, controller 385 may control vehicle 135 to provide autonomous driving. Controller 385 may operate to communicate (e.g., maintain mutual communication) with other vehicles 135 located nearby or within a suitable range (e.g., up to one mile or more or any other suitable range). Controller 385 may operate to monitor passenger on-boarding and exiting and may provide for safety information, announcements, and readiness. Controller 385 may also perform self-diagnostics on any suitable parameters. Controller 385 may control (e.g., turn on) a video camera of vehicle 135 should a passenger press the SOS call button for a monitoring center (e.g., to facilitate assessing the situation and taking the proper course of action). Controller 385 may also control vehicle 135 to change route to a nearest medical center or to a law enforcement or security station (e.g., based on video data, including video assessment and change of route instructions transferred via a satellite channel). Vehicle 135 may include an electric motor having high torque and wheels 360 may include high friction rubber tires, so that vehicle 135 may travel on track that may go through terrain such as mountainous terrain (e.g., and satellite communication may be accessible without interruption).

Transportation system 100 may also include a plurality of markers 400. For example, transportation system 100 may include hundreds, thousands, tens of thousands, or more markers 400. Markers 400 may be located on trunk lines 120, primary branch lines 125, and/or secondary branch lines 130. Markers 400 may be attached to structural assembly 210 and/or located near structural assembly 210 (e.g., integrated into stand-alone posts, signage, on a ground surface, underground, and/or at any other suitable location). Markers 400 may serve as distance or mile markers. Some markers 400 may be major mile markers located at each mile of track (e.g., that may correspond to and/or be used to identify data for that mile of track). Some markers 400 may be minor mile markers located at 0.1 mile intervals of the track (e.g., that may correspond to and/or be used to identify data for that tenth of mile of track). Markers 400 may be disposed at any other suitable intervals (e.g., up to every 100 feet, up to every 1000 feet or more, and/or any other desired interval). Markers 400 may be portable or fixed at a given location. Markers 400 may also receive and transmit marker data or marker signals (e.g., and/or include data or signals from sensors of markers 400). For example, markers 400 may communicate with controller 385, reader 390, passenger interface 395, and/or the exemplary disclosed network for example as described below. Marker 400 may be equipped with magnetic elements (e.g., relatively strong magnetic elements) so that vehicle 135 may accurately detect marker 400 when passing marker 400. Vehicle 135 may have dual magnetic pick-up sensors (e.g., a hall-effect device and/or a copper coil device) that may operate with marker 400.

As illustrated in FIG. 9A, marker 400 may include a marker communication device 405 that may include a wireless or contactless reader and/or transceiver (e.g., transmitter and/or receiver) and may communicate via any suitable technique similar to for example as described herein. Marker 400 may include an RFID transponder (e.g., an active or a passive RFID transponder). Marker 400 may also include Near Field Communication, Bluetooth low energy, RFID, and/or any other suitable communication components. Marker 400 may have a plurality of magnetic devices for an accurate position to be determined (e.g., picked up) by magnetic field sensitive devices in vehicle 135, such as hall-effect sensors and/or wound conductive coil sensors (e.g., and corresponding electronics installed at both front and rear end of vehicle 135 to function using a set/reset flip-flop logic). Markers 400 may include any suitable components for providing unique identification data and/or signals to readers 390 and/or the exemplary disclosed network. Markers 400 may include a marker housing 410 (e.g., a structural housing formed from plastic, metal, and/or any other suitable structural material) for housing, attachment, and/or protection of the exemplary disclosed components of marker 400. For example, each marker 400 of transportation system 100 may communicate a unique identifier (e.g., unique identification data and/or signals), which may be unique from every other marker 400, to other components of transportation system 100. For example, each marker 400 may be associated with a unique location of transportation system 100 associated with unique parameter data (e.g., geographic location, track configuration data such as radius of curvature of the track at that location for given lengths of track, and/or wheel rotation speed to be used at that location). A given marker 400 may provide data or signals indicative of a unique identifier that may be used by the exemplary disclosed system controllers to access or retrieve data of the exemplary disclosed database to be used for controlling vehicles 135.

In at least some exemplary embodiments, an RFID tag of marker 400 may be used for communicating with vehicles 135 to address operational issues such as roadway and visibility conditions. Alert messages may be transferred to vehicle 135 during conditions such as fog, storms, sun or road surface glare, and/or twilight environment conditions. Vehicle 135 having reader 390 (e.g., an RFID reader) may receive data of temporary road signs and/or special vehicles (e.g., school buses and/or oversize load vehicles).

Marker 400 may include a sensor 415. Sensor 415 may include a wind sensor. For example, sensor 415 may include an anemometer (e.g., thermal anemometer, vane anemometer, cup anemometer, and/or any other suitable type of anemometer) and/or any other suitable device for sensing wind velocity. Sensor 415 may include any other suitable sensors such as, for example, a thermometer, a hygrometer, a location sensor (e.g., GPS, Galileo, GLONASS, Beidou, and/or any other suitable location sensor), and/or any other suitable sensor for sensing ambient characteristics and/or any other desired data. Sensor 415 may include track quality monitoring sensors installed to detect potential abnormality of the infrastructure (e.g., exemplary disclosed track) such as, for example, excessive vibration, structural fatigue, structural fracture, temperature (e.g., for vehicle 135 to use for friction coefficients), and/or any other abnormality or information.

Sensor 415 may also include a humidity sensor and/or a moisture sensor such as a capacitive humidity sensor and/or a resistive humidity sensor. Sensor 415 may include any suitable sensor for measuring an amount of water (e.g., an amount of water in air or on a surface). Humidity data sensed by sensor 415 may be used to determine how wet a surface of the exemplary disclosed track, which comes into contact with wheels 360, may be for the purposes of calculating friction between wheels 360 and the exemplary disclosed track (e.g., and using the calculated friction in the exemplary disclosed calculations for turning based on differing rotational wheel speeds). Also for example, vehicle system 300 may control vehicle 135 to reduce speed or make any other suitable adjustments based on an amount of moisture or wetness sensed by sensor 415 (e.g., for example, sensor 415 may detect water or moisture in U-shaped portions 285 illustrated in FIGS. 5A and 5B).

Markers 400 may be electrically connected to and powered via power rails 280 similarly to as described above regarding vehicle drive assembly 350. In at least some exemplary embodiments, markers 400 may be separately powered (e.g., have a stand-alone power source) such as renewable power sources (e.g., solar panels similar to solar power collectors 270) and/or batteries.

FIGS. 10-13 illustrate another exemplary embodiment of transportation system 100. For example, several vehicles 135 may simultaneously move through intersection structures 200 and track structures 205 at a given time similarly to as described above regarding FIGS. 4-9 (e.g., in a series timing sequence).

Figure 14:
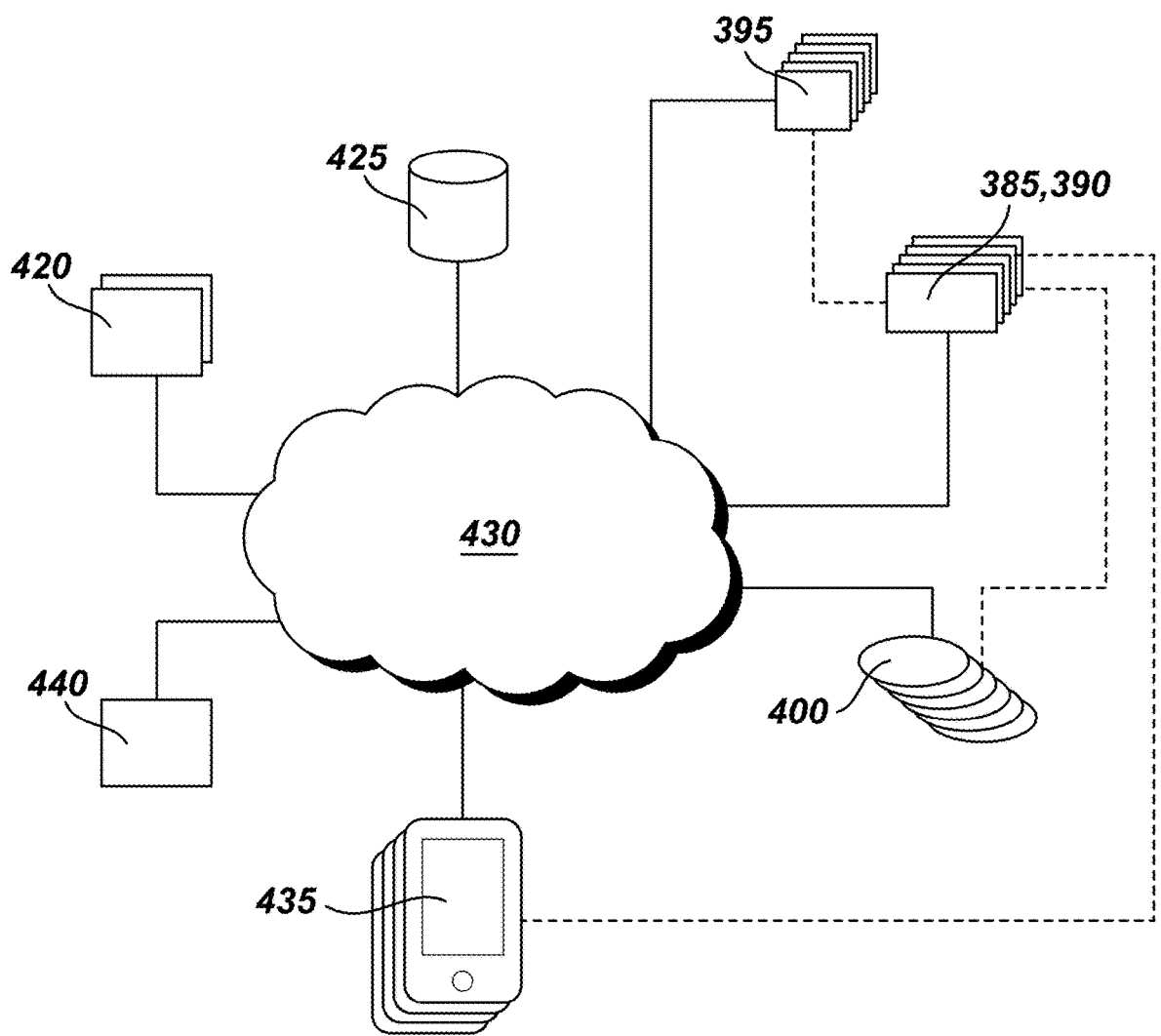
FIG. 14 is a schematic view of an exemplary embodiment of an exemplary system of the present invention.

FIG. 14 schematically illustrates communication (e.g., signal and/or data transfer) between the exemplary disclosed components of transportation system 100. The exemplary disclosed components may be integrated into vehicles 135 (e.g., vehicle control system 165 and/or vehicle system 300) and/or elements of hub 105, parking center 110, and/or station 115 of trunk line 120, primary branch line 125, and/or secondary branch line 130. The exemplary disclosed components may similarly be integrated into nation/state control system 145, regional control system 150, station control system 155, and/or line/track control system 160. Vehicle control system 165 may be onboard of vehicle 135, and may communicate with line/track control system 160. Line/track control system 160 may communicate with vehicle control system 165 and/or station control system 155 (e.g., or other suitable communication components of transportation system 100). If a given hub 105 has a functionality of a station 115, line/track control system 160 and station control system 155 may be deployed at that hub 105.

As illustrated in FIG. 14, transportation system 100 may include one or more system controllers 420 that may be associated with nation/state control system 145, regional control systems 150, station control systems 155, and/or line/track control systems 160. System controllers 420 may control an operation of transportation system 100 for example as described above regarding FIG. 2 and/or an overall operation as described herein. System controller 420 may be any suitable computing device for controlling an operation of components of transportation system 100. System controller 420 may include one or more computing devices (e.g., computers). System controller 420 may include for example a processor (e.g., micro-processing logic control device) and/or board components. System controller 420 may include data storage for example as described below. For example, system controller 420 may have storage for storing programming instructions for example as described below. One or more system controllers 420 may be located at one or more manned control centers (e.g., associated with control system 140) of transportation system 100. System controller 420 may include and/or be associated with communication devices that may communicate with system network 430 and/or directly with other components of transportation system 100 using any suitable exemplary disclosed communication techniques for example as described herein. Controller 385 may be similar to system controller 420 and may communicate with the exemplary disclosed system network and/or other components of transportation system 100 similarly to system controller 420.

Transportation system 100 may also include one or more system storages 425. System storages 425 may store data for use by system controllers 420. Transportation system 100 may include one or modules for performing the exemplary disclosed operations. For example, transportation system 100 may include one or more modules having computer-executable code stored in non-volatile memory. Transportation system 100 may include one or more storages (e.g., buffer storages) that may include RAM (e.g., system storages 425). The exemplary disclosed buffer storage may be implemented in software and/or a fixed memory location in hardware of transportation system 100. The exemplary disclosed buffer storage (e.g., a data buffer) may store data temporarily during an operation of transportation system 100. The exemplary disclosed module, storage (e.g., storage buffer), and hardware may include a memory (e.g., system storage 425) having stored thereon instructions, a processor (e.g., system controller 420 and/or controller 385) configured to execute the instructions resulting in a software application, and a software application (e.g., an app) configured to perform the exemplary disclosed processes. System storage 425 may include a hard disk drive, a solid state drive, flash memory, cloud storage, and/or any other suitable storage medium. System storage 425 may include computer-readable storage medium, and this medium may be internal or external, removable and replaceable, or fixed.

Any combination of one or more computer readable medium(s) may be utilized such as, for example, system storage 425. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store of system storage 425 may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory (e.g., system storage 425) capable of directing system controllers 420 (e.g., a computer or other programmable data processing apparatus) to function in a particular manner. The instructions stored in the computer-readable memory constitute an article of manufacture including computer-readable instructions for implementing any and all of the depicted functions.

A computer readable signal medium (e.g., system storage 425) that may be utilized by transportation system 100 may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, or any suitable combination of the foregoing.

As illustrated in FIG. 14, any desired number of user devices 435 may be utilized with transportation system 100 (e.g., for users to receive output and provide input to transportation system 100, similarly to passenger interfaces 395). For example, passenger interfaces 395 may be generally similar to user devices 435. User device 435 may be a smart device such as a smart tablet or a smartphone. User device 435 may be any suitable device for interfacing with other components of transportation system 100 such as a computing device (e.g., user interface). For example, user device 435 may be any suitable user interface for receiving input and/or providing output (e.g., image data) to a user. User device 435 may include a camera and a microphone. User device 435 may include, for example, a touchscreen device (e.g., of a smartphone, a tablet, a smartboard, and/or any suitable computer device), a wearable device, a computer keyboard and monitor (e.g., desktop or laptop), an audio-based device for entering input and/or receiving output via sound, a tactile-based device for entering input and receiving output based on touch or feel, a dedicated user interface designed to work specifically with other components of transportation system 100, and/or any other suitable user interface. For example, user device 435 may include a touchscreen device of a smartphone or handheld tablet. For example, user device 435 may include a display (e.g., a computing device display, a touchscreen display, and/or any other suitable type of display) that may provide output, image data, and/or any other desired output or input prompt to a user. For example, the exemplary display may include a graphical user interface to facilitate entry of input by a user and/or receiving output such as image data. An application for example as described herein and/or a web browser may be installed on user device 435 and utilized by a user. User device 435 may include storage that may be similar to system storage 425. For example, user device 435 may have storage for storing programming instructions for example as described herein.

As illustrated in FIG. 14, the exemplary disclosed components may communicate with and/or via a system network 430. System network 430 may be any suitable communication network over which data may be transferred between the exemplary disclosed components (e.g., components illustrated in FIG. 14). System network 430 may be the internet, a LAN (e.g., via Ethernet LAN), a WAN, a WiFi network, or combination and/or integration of any other suitable networks. The components of transportation system 100 may also be directly connected (e.g., by wire, cable, USB connection, and/or any other suitable electro-mechanical connection) to each other and/or connected via system network 430. For example, components of transportation system 100 may wirelessly transmit data by any suitable technique such as, e.g., wirelessly transmitting data via 4G LTE networks (e.g., or 5G networks) or any other suitable data transmission technique for example via network communication. The exemplary disclosed components illustrated in FIG. 14 may communicate via Wifi, Bluetooth, ZigBee, NFC, IrDA, and/or any other suitable communication technique. Any suitable communication components of system network 430 may be disposed along structural assemblies 210 and in other suitable locations of transportation system 100 to facilitate communication between vehicles 135 and any other suitable component of transportation system 100 for example as described herein.

As illustrated in FIG. 14, one or more system controllers 420 and one or more system storages 425 may communicate with the other exemplary disclosed components via system network 430. Controller 385, reader 390, and/or passenger interface 395 of each vehicle 135 of transportation system 100 may communicate directly or via system network 430 with each other, systems of other vehicles 135, markers 400 (e.g., markers 400 in a vicinity of a given exemplary disclosed component), and/or user devices 435 (e.g., user devices 435 operated by users both inside or outside vehicles 135 and/or both near and remote from a vicinity of transportation system 100). Transportation system 100 may include many vehicles 135, markers 400, and user devices 435. For example, a significant amount (e.g., hundreds, thousands, or tens of thousands or more) of controllers 385, readers 390, passenger interfaces 395, markers 400, and/or user devices 435 may communicate directly and/or via system network 430 with each other (e.g., and/or with one or more system controllers 420 and/or one or more system storages 425) during an operation of transportation system 100.

FIG. 15 schematically illustrates data associated with marker 400 and/or system storage 425. System storage 425 may store data such as, for example, track radius of curvature data (e.g., R1, R2, R3, and R4 and so on), track segment length data (e.g., L1, L2, L3, and L4 and so on), and/or any other suitable data at given tracks and/or locations (e.g., such as sensed data provided by markers 400). System storage 425 may store any other suitable data for use in controlling transportation system 100 such as, for example, physical data of vehicles 135 such as weight and dimensions, data of ambient conditions and weather, and/or any other desired data. System storage 425 may store many such data points (e.g., hundreds, thousands, millions or more data, depending on the size of transportation system 100) associated with many markers 400. Because in at least some exemplary embodiments, each marker 400 has a unique identification, a given marker 400 may be located at a given location of transportation system 100 having track features (e.g., radius of curvature and length) stored in system storage 425. As further described below, vehicles 135 passing a given marker 400 may communicate with that marker 400 and use the unique identification of that marker 400 to locate corresponding data in system storage 425. Sensed data of that marker 400 may also be provided by marker 400 to system storage 425 and retrieved (e.g., and/or sensed data of marker 400 may be directly communicated to a passing vehicle 135). The exemplary disclosed controllers may determine control instructions based on the data (e.g., radius of curvature and length) such as, for example, wheel speed for each wheel of vehicle 135 that may turn vehicle 135 for example as further described below.

Similar to markers 400, each vehicle 135 may have a unique identification number that may be stored as data by vehicle system 300 and/or system storage 425. Markers 400 may read a unique identification code of a passing vehicle 135 (e.g., via reader 390 and/or controller 385) that each vehicle 135 is assigned. This data may be used by system controller 420 to check against data of system storage 425. Transportation system 100 may report an emergency or unusual situation to operators (e.g., an alarm for human intervention) based on an expected vehicle 135 not being detected (e.g., vehicle 135 is missing or behind schedule). Control of vehicles 135 by the exemplary disclosed controllers may be updated or changed based on data indicating unusual operation of vehicles 135 and/or missing vehicles 135.

FIGS. 16A and 16B schematically illustrate wheels of vehicle 135. In addition to having four wheels, different vehicles 135 may have any desired number of wheels such as four to eight or more wheels. Wheels 360A, 360B, 360C, and 360D may be generally similar to wheel 360 described above. The exemplary disclosed wheels may be driven independently of each other at any desired speed (e.g., wheels 360A, 360B, 360C, and 360D may each be simultaneously, independently driven at different speeds from each other to maintain vehicle 135 on its intended course of travel). In at least some exemplary embodiments, wheels 360A and 360B may be main wheels and wheels 360C and 360D may be auxiliary wheels. Motors of main wheels 360A and 360B may have greater capacity and drive than auxiliary wheels 360C and 360D. When vehicle 135 moves forward as illustrated in FIG. 16A, main wheels 360A and 360B may operate to drive vehicle 135, while auxiliary wheels 360C and 360D may rotate freely. For example in normal operation when vehicle 135 is moving forward, two-wheel drive based on main wheels 360A and 360B may move vehicle 135. Auxiliary wheels 360C and 360D may operate to drive or help drive vehicle 135 in certain situations such as described below.

When vehicle 135 moves in reverse (e.g., a direction opposite to or different from forward) as illustrated in FIG. 16B, auxiliary wheels 360C and 360D may operate to drive vehicle 135, while main wheels 360A and 360B may rotate freely. When vehicle 135 is moving forward based on operation of main wheels 360A and 360B and encounters a relatively steep incline, auxiliary wheels 360C and 360D may also begin operation (e.g., motors may operate) and may join main wheels 360A and 360B in driving vehicle 135. Similarly when vehicle 135 is moving forward based on operation of main wheels 360A and 360B and acceleration is desired, auxiliary wheels 360C and 360D may also begin operation and may join main wheels 360A and 360B in driving vehicle 135.

Figure 17:
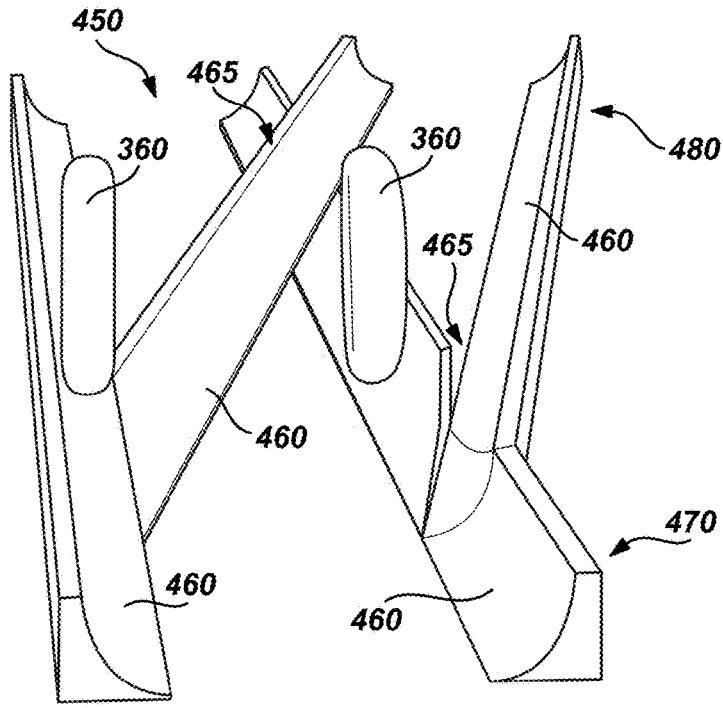
FIG. 17 is a perspective view of an exemplary embodiment of the present invention.
Figure 17A:
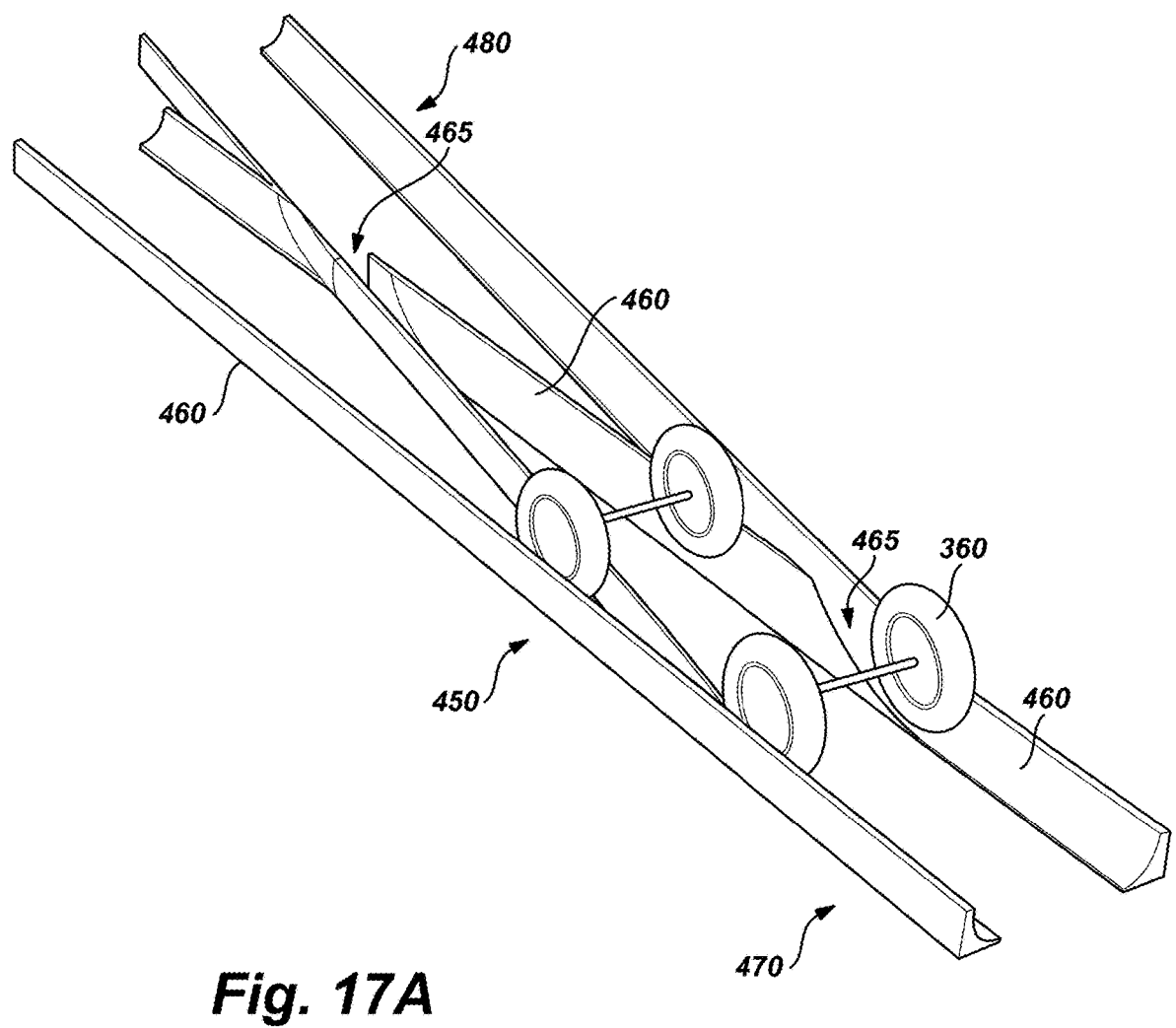
FIG. 17A is a perspective view of an exemplary embodiment of the present invention.

While FIGS. 5-13 illustrate an exemplary intersection structure 200 that may be utilized when vehicles 135 are disposed below structural assembly 210, FIGS. 17 and 17A illustrate exemplary embodiments that may be utilized when vehicles 135 are disposed above structural assembly 210. An intersection structure 450 may include a plurality of track guide members 460 that may be generally similar to track guide members 250. Spaces 465 may be formed in track guide members 460, which may allow for vehicles 135 to turn and to switch between tracks (e.g., between first track 470 and second track 480) similarly to the exemplary disclosed turning of vehicles 135 described above.

Figure 18:
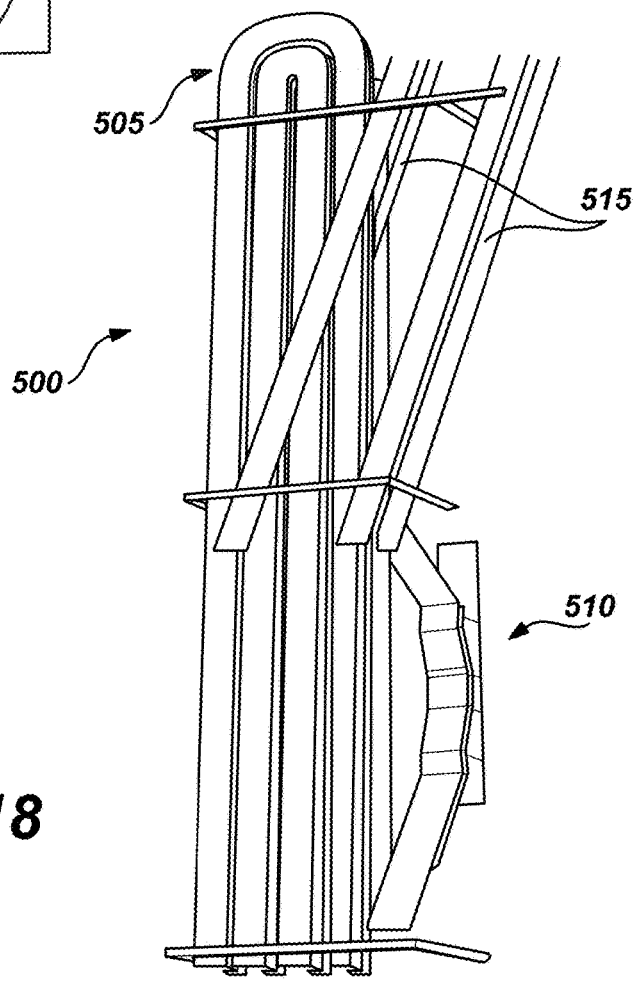
FIG. 18 is a top view of an exemplary embodiment of the present invention.

FIG. 18 schematically illustrates another exemplary embodiment of an intersection configuration 500 that may include intersection structures similar to intersection structure 200 and/or intersection structure 450. Intersection configuration 500 may include a turn-around track 505 that may for example be used to orient vehicles 135 in a desired direction relative to a platform 510 (e.g., may be a part of hub 105, parking center 110, station 115, or a U-turn point along the track) for passengers to board and exit vehicles 135 (e.g., or to move within a station). Alternatively, vehicle 135 may travel to a next jog handle or interchange area of a roadway at which transportation system 100 is provided. Platform 510 may be part of a by-pass track as illustrated in FIG. 18 (e.g., a ground level boarding platform or any floor level from which a passenger may enter vehicle 135). In at least some exemplary embodiments, platform 510 may be disposed at a relatively lower elevation than the exemplary disclosed track structures, which may make accessing platform 510 easier for passengers (e.g., less stairs to climb). As illustrated in FIG. 18, intersection configuration 500 may include access tracks 515 (e.g., siding) that may allow for acceleration and/or deceleration of vehicles 135 when merging on and off from trunk lines 120, primary branch lines 125, and/or secondary branch lines 130 to reach platform 510. FIGS. 18A and 18B illustrate another exemplary embodiment of intersection configuration 500 (e.g., 4 lanes with a ground level station).

Figure 19:
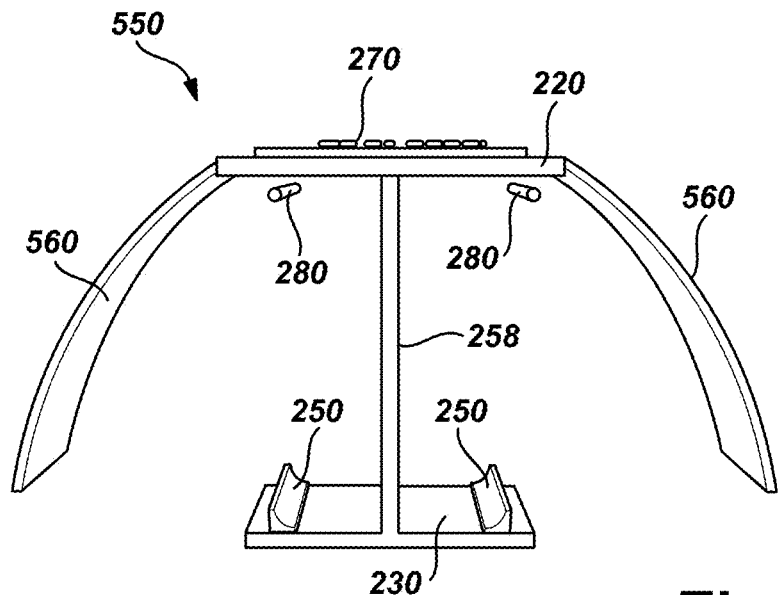
FIG. 19 is a perspective view of an exemplary embodiment of the present invention.
Figure 20:
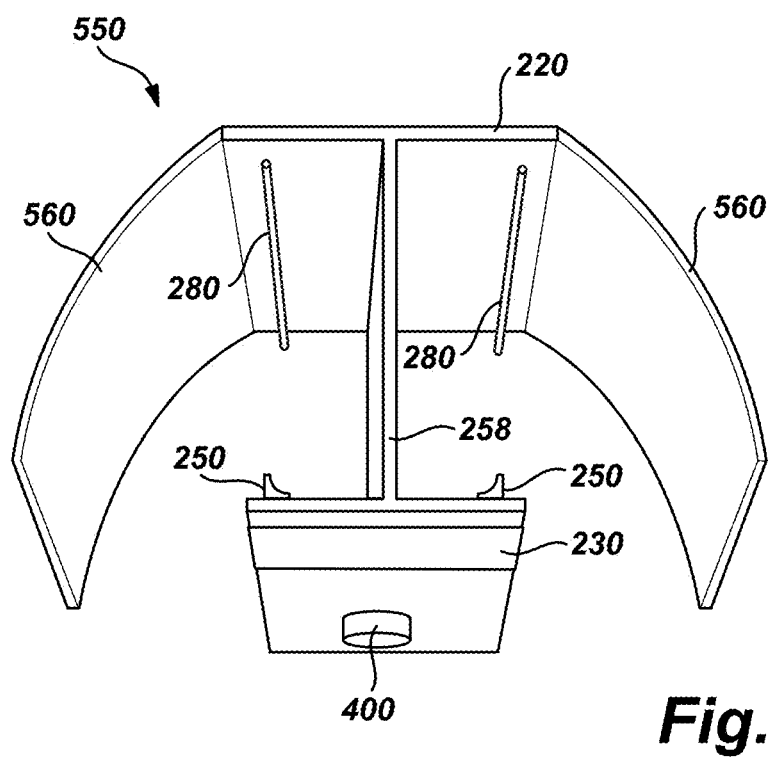
FIG. 20 is another perspective view of an exemplary embodiment of the present invention.

FIGS. 19 and 20 illustrate another exemplary embodiment of the exemplary disclosed structural assembly. Structural assembly 550 may be generally similar to structural assembly 210. Structural assembly 550 may include guard members 560 that may be formed from material similar to other structural portions of structural assembly 210 described above and/or any material durable in view of inclement weather. Guard members 260 may serve to protect track, vehicles 135, and/or passengers against the elements (e.g., precipitation, wind, sun, and/or other natural forces). Guard members 560 may be included in any of the above described exemplary track configurations (e.g., of FIGS. 4-13).

In at least some exemplary embodiments, the exemplary disclosed structural assembly (e.g., structural assembly 210 or structural assembly 550) may be an H-beam structure or reversed U-beam structure. Track may be embedded into the beam structure. The exemplary disclosed solar panels, electric power lines, anemometers or wind velocity meters, and/or markers may be installed in the beam structure. The exemplary disclosed structural assembly may be lightweight based on eliminating pavement over the beam structure. Any desired track width may be used such as, for example, about 5 feet (e.g., with space between tracks about 2 feet). A four track system may be about 26 feet wide (e.g., 2 lanes of 24 ft total plus a shoulder) or any other desired width.

The exemplary disclosed system, apparatus, and method may be used in any suitable application for transporting passengers, goods, vehicles, luggage, and/or any other suitable objects or material. The exemplary disclosed system, apparatus, and method may be used in any suitable application for ground transportation such as, for example, public transportation or private transportation. For example, the exemplary disclosed system, apparatus, and method may be used in any suitable application for public ground transportation. The exemplary disclosed system, apparatus, and method may be used in any suitable application for public or private transportation such as long distance transportation or for commuting.

Figure 23:
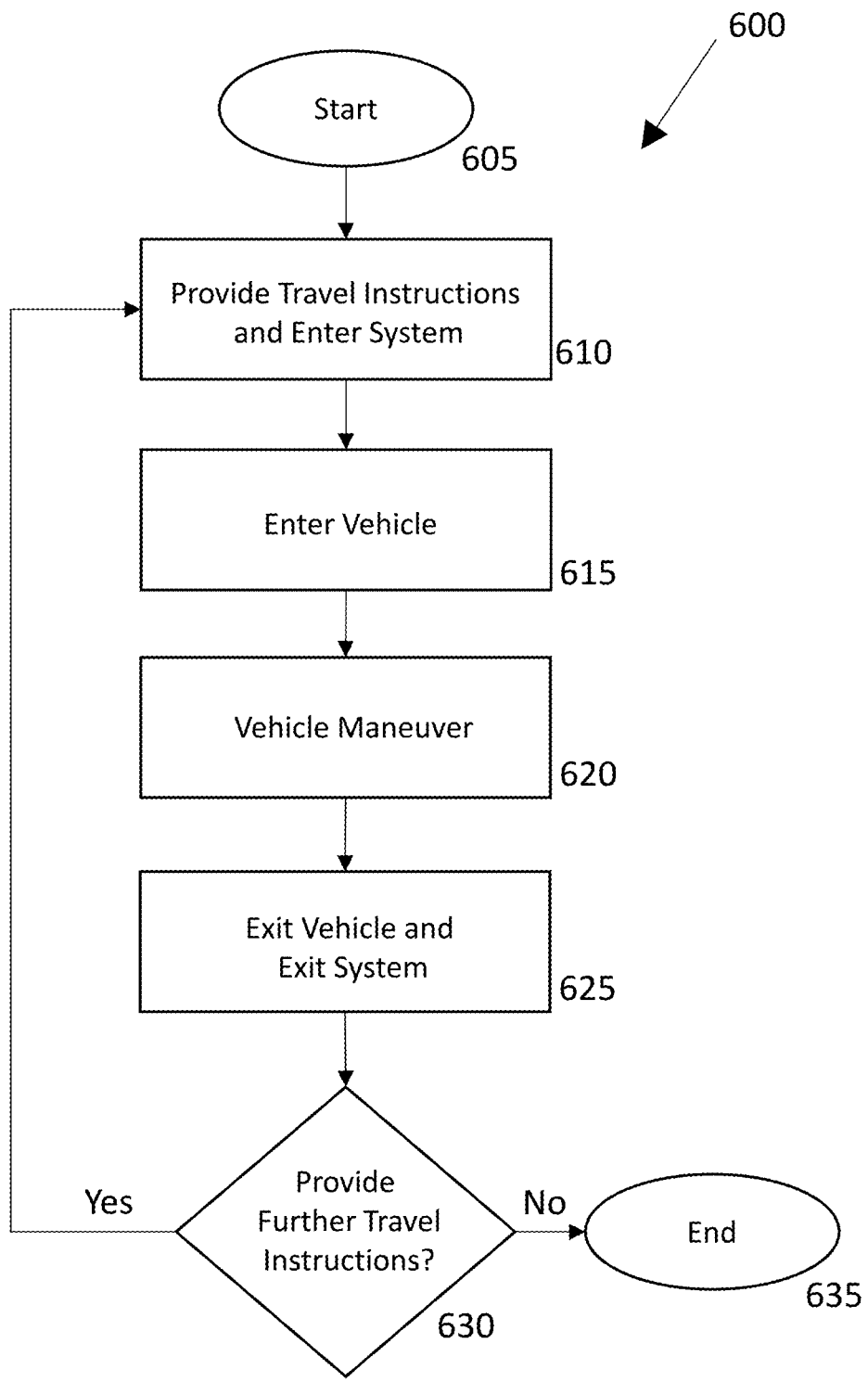
FIG. 23 illustrates an exemplary process of operation of at least some exemplary embodiments of the present disclosure.

FIG. 23 illustrates an exemplary process for operation of the exemplary disclosed system and apparatus. Process 600 begins at step 605. At step 610, travel instructions may be provided to transportation system 100 and one or more passengers associated with those travel instructions may enter transportation system 100. Travel instructions may be provided by the passengers or by other users (e.g., and/or by exemplary disclosed automated processes such as described herein) on behalf of the passengers. Passengers may enter transportation system 100 (e.g., an exemplary disclosed location of transportation system 100) before, during, or after the travel instructions are provided. Passengers may enter transportation system 100 at any desired location such as, for example, at parking center 110 or station 115.

Travel instructions may be provided via input entered by users (e.g., passengers and/or other users) using any suitable user device (e.g., computing device) such as user device 435 and/or a station kiosk 440. For example, an application (e.g., app) associated with the exemplary disclosed modules may be installed on user device 435. In at least some exemplary embodiments, travel instructions may be provided at step 615 below via passenger interface 395 after users (e.g., passengers) have boarded vehicle 135 for example as described below. Returning to step 610, travel instructions may be provided via user input, predetermined algorithms, artificial intelligence or machine learning operations, and/or any other suitable technique for providing and determining travel information. Travel instructions may be assigned a route id (e.g., unique identifier) and stored by system storage 425 for use by the exemplary disclosed controllers in controlling an operation of transportation system 100.

In at least some exemplary embodiments, travel instructions may be provided by a user using an app that may be installed on user device 435, station kiosk 440, passenger interface 395, and/or any other suitable computing device. The exemplary disclosed module (e.g., via the exemplary disclosed app) may process travel instructions using an on-demand model. The user (e.g., passenger) may use the app to schedule a pick-up location (e.g., a particular parking center 110 or station 115, which may include loading lanes for passengers to board vehicles 135), time, number of riders, and destination. The user may reserve a vehicle 135 based on this input. A user may receive boarding gate information before (e.g., minutes prior) to an arrival of vehicle 135 (e.g., a passenger may specify a boarding station, date, and time during scheduling). The app may provide the user with an estimated time to arrive at the start location and destination. Transportation system 100 may identify and designate a suitable vehicle 135 for use based on the provided information and data stored in system storage 425 regarding vehicles 425 (e.g., capacity, current location of vehicles 135, maintenance status, and/or any other suitable criteria). The user may confirm and provide payment via the app (e.g., or at the start location) prior to boarding vehicle 135. The user may arrive at the start location (e.g., a particular parking center 110 or station 115) prior to the scheduled departure time to board a designated and confirmed vehicle 135.

The exemplary disclosed module (e.g., via the exemplary disclosed app) may also process travel instructions using a shared car model. Travel information may be provided similarly to as described above regarding the on-demand model. Transportation system 100 may group users (e.g., passengers) having a same destination and window of time (e.g., and/or similar start locations) to arrival based on travel instructions to a single vehicle 135. If no other users are identified as having similar travel instructions, the model may switch back to the on-demand model. The vehicle 135 may pause for a predetermined wait time to await users with similar travel instructions. Additionally, the system may have a fixed schedule involving departing specific stations and traveling to specific destinations during peak hours of the fixed schedule. The system may dispatch many vehicles standing by at a station. A given vehicle may depart for a planned destination in a "load and go" mode (e.g., load a vehicle 135, with vehicle 135 departing once it is loaded).

A given vehicle 135 operating using the exemplary disclosed models may serve as a dedicated vehicle for a user or a group of users based on the travel instructions. The given vehicle 135 may travel point-to-point (e.g., from the desired start location to the desired end location of the travel instructions) without stopping (e.g., without stopping or without transfer of passengers between vehicles 135). Passengers may use user devices 435 and/or passenger interfaces 395 to stop vehicle 135 if desired (e.g., to take a restroom break or a medical emergency). A passenger may then decide to keep vehicle 135 standing by (e.g., if space allows), or to release vehicle 135 and reserve another vehicle 135 at a later time.

At step 615, one or more passengers may enter transportation system 100 (e.g., or already may have previously entered transportation system 100) and may board vehicle 135 (e.g., at a boarding lane of a particular parking center 110 or station 115) that has been determined and identified to the one or more passengers (e.g., via the app). For example, transportation system 100 may identify a particular loading lane via the app for passengers to use. Once the one or more passengers have boarded the designated vehicle 135, any suitable safety procedures may occur (e.g., fastening seat belts if applicable, announcements, locking a door of vehicle 135, and/or any other suitable procedures). Process 600 may then proceed to step 620.

At step 620, vehicle 135 maneuvers from the start location to the end location based on the user's travel instructions. As vehicle 135 travels along structural assemblies 210 of one or more trunk lines 120, primary branch lines 125, and/or secondary branch lines 130, vehicle 135 may move near a plurality of (e.g., numerous) markers 400. A route database may be created each trip as a first step of a new trip (e.g., including information similar to as described herein, for example regarding the exemplary disclosed onboard database). As vehicle 135 moves near a given marker 400, reader 390 may communicate with marker 400 using the exemplary disclosed communication techniques for example as described herein. Reader 390 may begin communication with marker 400 at any suitable time and/or distance (e.g., based on a velocity of vehicle 135) such as, for example, 0.2 seconds, 0.4 seconds, 0.6 seconds, or more. The headway distance may be the minimum travel time based on the current speed (e.g., which has factored into it a vehicle mass and a payload mass in a vehicle data profile). Vehicle control system 165 may detect a vehicle traveling speed and the headway distance to evaluate whether it complies with suitable headway criteria.

Reader 390 may receive data and/or signals providing a unique identification of marker 400 by using the exemplary disclosed communication techniques. Reader 390 may also receive data and/or signals providing sensed data of sensor 415 of marker 400 (e.g., directly from marker communication device 405 and/or via system network 430). Reader 390 may communicate the unique identification of marker 400 to controller 385 using the exemplary disclosed communication techniques.

Controller 385 may communicate with system storage 425 via system network 430 using any suitable communication technique for example as described herein. Based on data of the unique identification of marker 400 located near vehicle 135, controller 385 may communicate with and receive data from system storage 425. Controller 385 may receive data similar to for example as described above regarding FIG. 15. For example, controller 385 may receive data at a location of marker 400 of track radius of curvature data, track segment length data, and/or ambient conditions and weather (e.g., wind velocity, weather data, track radius, curvature, and/or track segment data may be preloaded in the exemplary disclosed onboard database, and vehicle 135 may use the exemplary disclosed marker ID to look up data in the database and control vehicle 135 accordingly). Any of the exemplary disclosed communication techniques described herein may be utilized. Controller 385 may also receive physical data of vehicle 135 such as weight and dimensions and/or any other desired data. Data such as weight, dimensions, and other static (e.g., constant) information may be included in the exemplary disclosed databases. Vehicle 135 may also have a self-diagnostic feature, with data of this feature being included in the exemplary disclosed databases (e.g., wheel vibration, number of wheel rotations between markers 400 to determine wear-out conditions, noise signature, motor temperature, and/or any other data collected by the exemplary disclosed computer that may act as an onboard diagnostic computer).

Each vehicle 135 may have its own data profile such as, for example, weight, length, and/or service category (e.g., passenger, car carriage, and/or cargo). Vehicle 135 may use communication and/or data based on marker 400 to look up on system storage 425 and/or an onboard database (e.g., of vehicle system 300) data for: speed (e.g., for the next 1/10 mile or any other suitable distance), turn direction, radius and length of arc of each track, wind speed calibration factors based on vehicle service category, and/or distance to nearby vehicles.

Because markers 400 may be disposed along tracks of transportation system 100 as described herein, reader 390 may communicate with each nearby marker 400 as vehicle 135 moves. Based on data and/or signals of each nearby marker 400 received via reader 390 (e.g., looked up from the exemplary disclosed onboard database indexed by marker identification information of marker 400), controller 385 may receive data sets corresponding to each marker 400 approached and passed by vehicle 135. For example, a preloaded dataset of an entire service map of a region, state, or nation may be used. In an area where two tracks may be located near each other, marker 400 may be equipped with an antenna (e.g., a high gain directional antenna) to substantially prevent unintentional misreading from nearby markers 400. For example, system storage 425 may include data sets corresponding to each unique identifier provided by data and/or signals of each nearby marker 400, which may be transferred to vehicle system 300 via the exemplary disclosed communication techniques (e.g., to perform local database look up by vehicle system 300). Controller 385 may use this data to control an operation of vehicle 135 for example as described below.

Controller 385 may independently vary a rotational speed of each wheel 360 by controlling each motor 365 of vehicle 135 at each location of each given marker 400 based on the exemplary disclosed data received from the exemplary disclosed onboard storage and/or system storage 425 based on the unique identification of marker 400 received by reader 390. For example based on the exemplary disclosed data of track radius of curvature data, track segment length data, and/or ambient conditions (e.g., wind velocity), controller 385 may make mathematical and/or geometrical calculations to determine varying wheel speeds of wheels 360 to turn vehicle 135 at a desired radius of curvature along a desired length of track to move vehicle 135 as desired (e.g., so that wheels 360 move along track guide members 250 to pass through openings 255 of intersection structure 200 and/or move along track guide members 460 to pass through spaces 465 of intersection structure 450). For example, controller 385 may control wheels 360 on an outside of a desired turning curve of vehicle 135 to move faster than wheels 360 on an inside of the desired turning curve of vehicle 135, causing vehicle 360 to turn. For example, controller 385 may control respective motors 365 to drive each of wheels 360A, 360B, 360C, and 360D at a different rotational speed so that turning of vehicle 135 matches a desired path for example as illustrated in FIG. 15 based on any suitable mathematical, algebraic, and/or geometrical techniques (e.g., any suitable kinematics equations and calculations such as forward kinematics and inverse kinematics). Because vehicle 135 may be turned based on controller 385 controlling wheels 360 to turn at varying rotational speeds, vehicle 135 may be turned on structural assembly 210 without use of mechanical track switches, which may wear out based on extensive use. Vehicle control system 165 may check (e.g., constantly check) revolutions of wheels 360 against a distance between markers 400, so that wheel wear out is incorporated into the exemplary disclosed calculations and algorithms (e.g., the wheel wear out condition may be part of the exemplary disclosed self-diagnostic information that may be used to notify line/track control system 160 if vehicle 135 is due for wheel service). In at least some exemplary embodiments, transportation system 100 may be a switchless system with tracks having no track switches (e.g., tracks that lack mechanical switches).

Controller 385 may similarly control motors 365 to drive wheels 360 (e.g., wheels 360A, 360B, 360C, and 360D) at varying speeds and/or to rotate freely to accelerate vehicle 135, move vehicle 135 forward or in reverse, and/or to provide additional power for moving up inclined tracks for example as described above regarding FIGS. 16A and 16B. Controller 385 may control vehicle 135 to move forward or in reverse, to accelerate, and/or to provide more or less power to wheels 360 based on data received from system storage 425.

The exemplary control calculations described above may also be partially and/or entirely made by system controller 420 and transferred as control instructions to controller 385 (e.g., via system network 430). Also for example, controller 385 and/or vehicle control system 165 may perform the exemplary control calculations described above based on database information indexed by marker 400. System controllers 420 and/or controllers 385 may control vehicles 135 (e.g., simultaneously control all vehicles 135) to operate safely (e.g., avoid collisions) and efficiently (e.g., avoid congestion) based on calculations to control traffic flow based on the exemplary disclosed data stored in system storage 425. System controller 420 may instruct controller 385 to take action if a special event arises (e.g., make a detour in the route to avoid an incident of which information was just received, or to make a detour to the next service location at the end of a current route). For example, system controllers 420 and/or controllers 385 may control (e.g., dynamically control in real-time) vehicles 135 to take a shortest path and/or fastest route (e.g., may reduce an overall average travel distance and/or travel time of vehicles 135 in the aggregate). Also for example, controller 385 may calculate a traffic route. Data of emergency and/or unusual circumstances may also be received by controller 385 for example directly from markers 400 and/or from system storage 425 via system network 430. For example, data of stalled or inoperable vehicles 135, location of damaged structural assemblies 210, extreme weather data, accidents involving vehicles 135, and/or any other similar data may be received from user devices 435, passenger interfaces 395, markers 400, and/or any other suitable component of transportation system 100 and stored by system storage 425. System controllers 420 and/or controllers 385 may operate to communicate with and/or control vehicles 135 and/or other components of transportation system 100 at a location nearby and/or affected by emergencies or unusual circumstances. In an urgent situation, system controller 420 may use a satellite link to report its GPS data (e.g., coordinates and situation information) to the exemplary control system that may be associated with an emergency response team that may be on duty.

Figure 21:
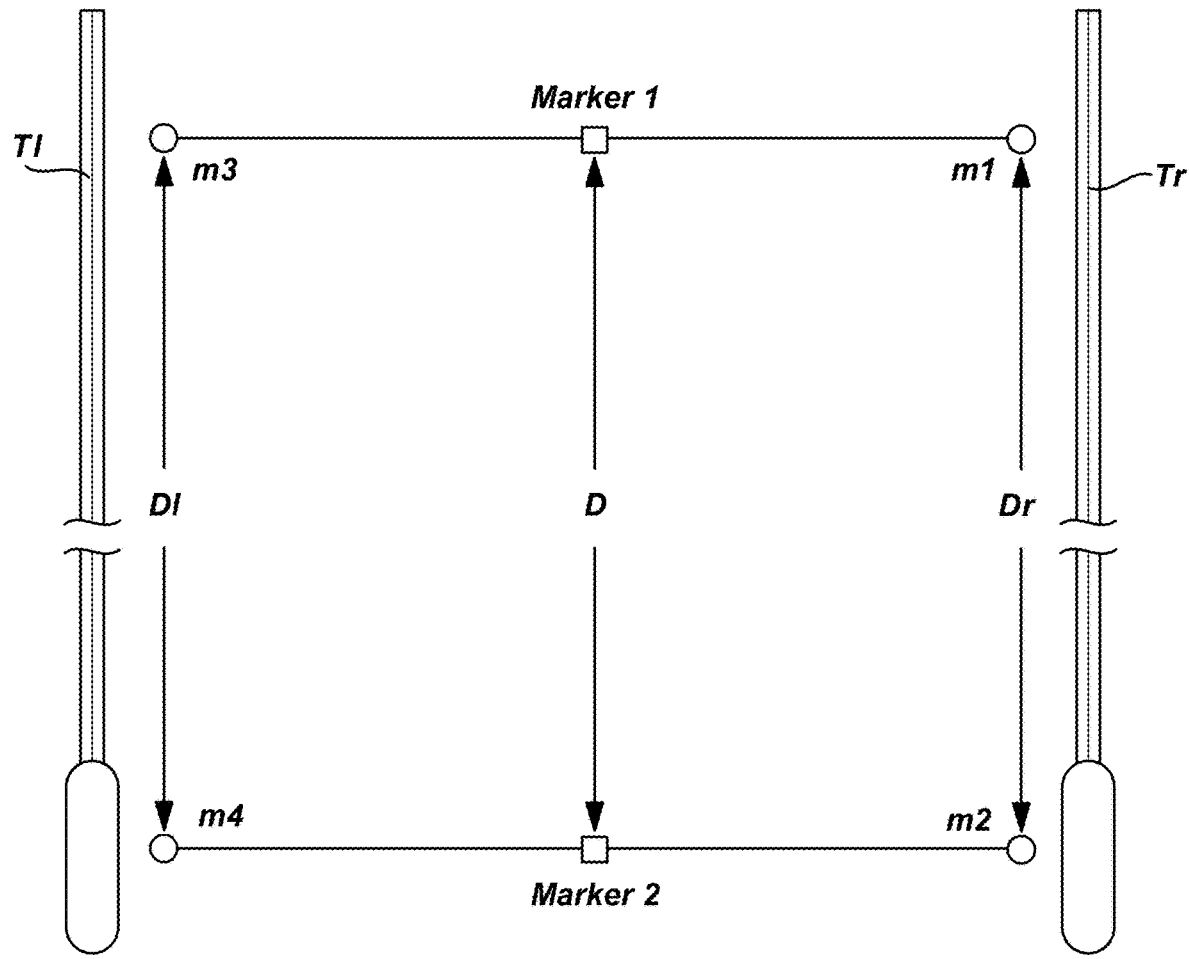
FIG. 21 is a schematic view of an exemplary embodiment of an exemplary system of the present invention.
Figure 22:
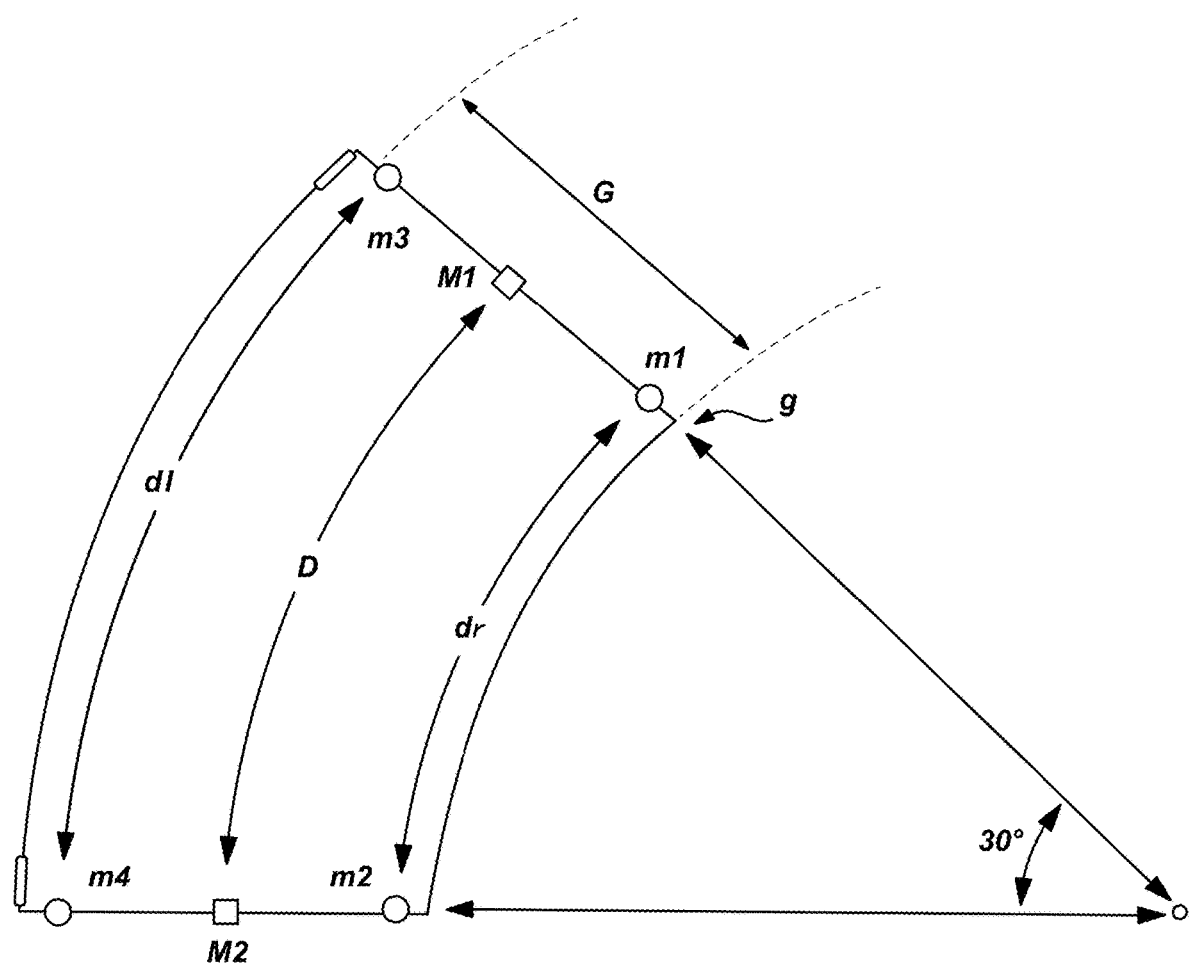
FIG. 22 is another schematic view of an exemplary embodiment of an exemplary system of the present invention.

FIGS. 21 and 22 illustrate exemplary embodiments regarding changing the direction of the vehicle by tuning the wheel rotational speed.

FIG. 21 illustrates an exemplary embodiment in which a guideway is a straight line. The tracks may be in parallel (e.g., a guide way may have two tracks, a left track Tl and a right track Tr). A marker may be installed at a fixed location where a distance between marker (D) may be fixed (e.g., known to a vehicle from the on-board database look up). Each marker may have two magnets installed, which may be relatively far apart to both sides. Because the tracks may be in parallel, a distance (Dr) of right-side magnet for marker 1 and marker 2 may be the same distance between markers (D) (e.g., as the distance for the left side magnets Dl). One revolution of the wheel may travel $WT=2\pi R$, where R is the radius of the wheel. When the left wheel and right wheel have an identical diameter, then $WTl=WTr$ (therefore, to travel the distance D, the number of rotations of each wheel is $N=D/WT$).

The diameter of two wheels may not be identical (e.g., one of the wheels may wear out more than the other, or one wheel may be inflated more than the other to the point that the diameter difference is measurable). In such a case, because a right wheel radius will not be identical to the left wheel's radius, $Rr \neq Rl$, and therefore $WTl \neq WTr$. The number of rotations for left and right wheel are $Nl=D/WTl$ and $Nr=D/WTr$. The time it takes for both wheels to move from marker 1 (M1) to marker 2 (M2) are to be identical. $T=D/WTr*RPMr$ (right wheel's rotations per minute), and $T=WTl*RPMl$ (left wheels RPM). It would take the vehicle control system passing two initial markers to learn the value of WTl and WTr. Once this value is learned, the vehicle control system may then control the wheels rotational speed accordingly to provide for the suitable ROM for traveling a fixed distance.

For example, assuming M1 to M2 is 500 feet apart, the wheel's diameter is roughly 24 inches (about an 18 inches car tire with 3 inches wall), and the right is 4.2% less than left wheel (24 inches vs 23 inches). One rotation of left wheel is 12.57 feet, right wheel is 12.04 feet. It will take the left wheel 39.77 rotations to complete 500 feet and will take the right wheel 41.53 rotations to complete the same distance. If both wheels are turning at the same RPM initially, it will make the pod turn in direction to the right because with the same amount of rotations, the right wheel doesn't travel as far as the left wheel. The vehicle control system may learn this difference (e.g., at a very beginning of operation) when the pod is put into (or resumes) service. Once the vehicle control system has learned this, the vehicle control system can constantly calibrate the parameter of wheel diameter by using mile markers and monitoring the RPMs to complete the distance. Therefore, in the initial segment of the guideway in which the vehicle is returned to service from maintenance, the mile markers may be relatively close in distance (e.g., perhaps 50 to 100 feet), depending on the design tolerance.

FIG. 22 illustrates another exemplary embodiment in which a guideway turns. For example, the inner track may be a segment of the circle of 200 ft radius (e.g., a span for 30 degrees to the next marker, which may continue turning the same arc, or it might change to straight line, or turn the opposite direction, e.g., per the exemplary disclosed database). A distance between two tracks may be G, and there may be a small gap (g) between the magnets m1, m2, m3, m4 to the track (e.g., for clarity, agents may be considered as installed on the center of the track. The remaining notations may be similar to as described above regarding FIG. 21 (D may be the distance between marker 1 and marker 2). As illustrated in FIG. 22, a distance between inner side (right side) magnets m1, m2 and outer side (left side) magnets m3, m4 may be different. These are represented by dl and dr. In this illustration, for example, dl>dr. When the vehicle is passing m2, the vehicle may pick up turn information from the database, for indicating that the radius of the turn may be 200 ft+½ G (e.g., assuming the middle of the guideway to measure the turn radius). Therefore, $dr=2*\pi*200$ ft*(30 degree/360 degree); $dl=2*\pi*(200$ ft+G$)*(30$ degree/360 degree). The vehicle control system now has the parameter that one turn of left wheel is WTl, and one turn of the right wheel is WTr. The vehicle control system may ensure that the left and right wheel reaches the next mile marker at the same time (e.g., the hall effect device picks up the magnetic field of m1 and m3 at approximately the same time; it is a design parameter, but here it is assumed that it is within 1/1000 of a second). For the left wheel to complete the distance dl, the left wheel turns Nl=dl/WTl; and the right wheel turns Nr=dr/WTr. The database may provide instructions that the travel speed is x mph (may assume that the number translates to 5 second from marker M2 to marker M1). The vehicle control system provides for the left wheel to be turning at the rotational speed of RPMl=Nl (number of turns)/5(seconds)*60(seconds), and the right wheel to be turning at RPMr=Nr (number of turns)/5(seconds)*60(seconds). Because the distance dl may be larger than dr, if the wheel diameter is close or identical, then RMl is greater than RPMr.

Returning to FIG. 23, at step 625, after a given vehicle 135 has completed its maneuver from its start point to its end point of the exemplary disclosed travel instructions (e.g., without stopping), vehicle 135 may stop at its end point (e.g., a boarding lane of parking center 110 or station 115). Passengers may exit vehicle 135 and may exit transportation system 100.

At step 630 it may be determined whether further travel instructions are to be provided to transportation system 100 (e.g., for a return trip or a further trip, or for another day of commuting or stay in depot). If additional travel instructions are to be provided, process 600 returns to step 610. Exemplary further travel instructions may include: stay at the destination station due to a next leg following soon; move to depot (e.g., yard) to wait for a next dispatch; go to a service center for maintenance and/or repairs should an abnormal condition be detected by the exemplary disclosed on-board system; or go to another station for a new leg of service. As many iterations as desired of steps 610 through 630 may be performed. If additional travel instructions are not to be provided, process 600 ends at step 635.

In at least some exemplary embodiments, the exemplary disclosed vehicle control system and system storage may store current mile marker instructions (e.g., direction, speed, distance between vehicles, turns, and/or communicating with other vehicles within a predetermined range), maintain records of passenger on/off boarding, and/or record and report position and distance between vehicles to the exemplary disclosed station control system. The exemplary disclosed vehicle control system and system storage may also control a vehicle's dynamic parameters (e.g., speed, direction, distance between vehicles, track ID, mile marker look-up to on-board database, and/or service status), coordinate with nearby vehicles for distance coordination during merging between tracks, notify line/track control in the event that a passenger overwrites a route (e.g., taking a restroom break or medical emergency), and/or provide destination-based information browsing (e.g., via the exemplary disclosed app) such as tourist attractions, culture, history, novelty, food, and/or lodging. The exemplary disclosed vehicle control system of a given vehicle and system storage may also coordinate with nearby vehicles for distance coordination during merging of vehicles between tracks. For example, the coordination may be done in an autonomous manner in which vehicle control systems may communicate with each other and follow predetermined operations (e.g., programmed rules and algorithms) to allow other vehicles to merge.

In at least some exemplary embodiments, each marker 400, vehicle 135, and travel instructions (e.g., including routes to be used) may have unique identifiers, with this data being stored in system storage 425. These unique identifiers may be updated as changes are made to transportation system 100. In system storage 425 (e.g., the database), a given record may be indexed to a route ID and data of markers 400 (e.g., including the distance to track splitting, the direction of splits, the angle of splitting, the distance of travel, instructions to follow following splitting such as direction to travel). For example, two actions may be associated with a given database point (e.g., current action and immediately following action to take once the current action is completed). Additional markers 400 may be provided when a certain portion of transportation system 100 involves a significant amount of actions (e.g., curvy track such as mountainous tracks).

The invention includes other illustrative embodiments ("Embodiments") as follows.

Embodiment 1. A method, comprising: moving a vehicle having a plurality of wheels along a track; receiving a marker data or a marker signal from a marker at a location of the track using a reader of the vehicle; controlling a first rotational speed of a first wheel of the plurality of wheels at the location of the track based on the marker data or the marker signal; and controlling a second rotational speed of a second wheel of the plurality of wheels at the location of the track, independently of the first rotational speed, based on the marker data or the marker signal; wherein the first rotational speed is different from the second rotational speed.

Embodiment 2. The method of Embodiment 1, further comprising turning the vehicle at an intersection structure of the location of the track based on controlling the first rotational speed of the first wheel that is different from the second rotational speed of the second wheel.

Embodiment 3. The method of Embodiment 2, wherein turning the vehicle at the intersection structure includes moving the first wheel and the second wheel through a plurality of openings or spaces of the intersection structure.

Embodiment 4. The method of Embodiment 1, wherein controlling the first rotational speed and the second rotational speed is based on a radius of curvature and a length of the track at the location of the track.

Embodiment 5. The method of Embodiment 4, further comprising receiving data of the radius of curvature and the length using a controller of the vehicle based on the marker data or the marker signal that is a unique identifier of the marker that identifies the marker out of a plurality of markers disposed along the track.

Embodiment 6. The method of Embodiment 1, further comprising: moving the vehicle forward by driving the first wheel and the second wheel; moving the vehicle backward by driving a third wheel and a fourth wheel of the plurality of wheels; and accelerating the vehicle or moving the vehicle on the track when the track is inclined by driving the first wheel, the second wheel, the third wheel, and the fourth wheel.

Embodiment 7. The method of Embodiment 1, further comprising driving the first wheel and the second wheel using a plurality of motors powered by solar energy.

Embodiment 8. The method of Embodiment 7, further comprising: collecting solar energy using solar power collectors disposed along the track; transferring the solar energy along the track using a power rail; and transferring the solar energy from the power rail to the vehicle.

Embodiment 9. An apparatus for a vehicle having a plurality of wheels that moves along a track, comprising: a marker configured to be disposed at a location of the track; a reader configured to be disposed at the vehicle, the reader configured to receive a marker data or a marker signal from the marker; and a controller configured to be disposed on the vehicle, the controller configured to control turning of the vehicle based on: controlling a first rotational speed of a first wheel of the plurality of wheels at the location of the track based on the marker data or the marker signal; and controlling a second rotational speed of a second wheel of the plurality of wheels at the location of the track, independently of the first rotational speed, based on the marker data or the marker signal; wherein the first rotational speed is different from the second rotational speed.

Embodiment 10. The apparatus of Embodiment 9, wherein the controller is configured to communicate with at least one of a system controller and a storage via a network, the controller configured to utilize data of a unique identifier of the marker that identifies the marker out of a plurality of markers disposed along the track, the unique identifier being based on the marker data or the marker signal.

Embodiment 11. The apparatus of Embodiment 10, wherein the controller is configured to identify data of the radius of curvature and the length from the at least one of the system controller and the storage based on the unique identifier.

Embodiment 12. The apparatus of Embodiment 9, wherein the controller is configured to communicate with at least one of a system controller and a storage via a network, the controller configured to transfer data of a unique identifier of the vehicle that identifies the vehicle out of a plurality of vehicles disposed along the track.

Embodiment 13. A method, comprising: moving a plurality of vehicles along a plurality of tracks, each of the plurality of vehicles including a reader and a plurality of wheels; receiving marker data or marker signals from at least some of a plurality of markers disposed along the plurality of tracks using the reader of each of the plurality of vehicles; and varying rotational speeds of some of the plurality of wheels independently from other of the plurality of wheels of each of the plurality of vehicles based on the marker data or the marker signals.

Embodiment 14. The method of Embodiment 13, further comprising preventing transfer of any passengers or any goods between the plurality of vehicles.

Embodiment 15. The method of Embodiment 13, further comprising moving the plurality of vehicles along the plurality of tracks using solar energy.

Embodiment 16. The method of Embodiment 13, further comprising turning the plurality of vehicles based on varying the rotational speeds of the plurality of wheels of each of the plurality vehicles.

Embodiment 17. The method of Embodiment 16, wherein the plurality of tracks, on which the plurality of vehicles turns, is a plurality of switchless tracks lacking mechanical switches.

Embodiment 18. The method of Embodiment 13, further comprising moving the plurality of vehicles between a plurality of trip start locations and a plurality of trip end locations via a plurality of transfer hubs that transfer the plurality of vehicles between different track lines of the plurality of tracks, the plurality of vehicles continuously moving and not stopping while moving through the plurality of transfer hubs.

Embodiment 19. The method of Embodiment 18, further comprising preventing transfer of any passengers or any goods between the plurality of vehicles while the vehicles are passing through the plurality of transfer hubs.

Embodiment 20. The method of Embodiment 13, wherein the plurality of tracks are structurally supported by a plurality of structural assemblies including a plurality of guard members disposed above the plurality of tracks, the plurality of guard members covering the plurality of tracks.

Embodiment 21. The method of Embodiment 13, further comprising supporting the wheels in a U-shaped portion of the plurality of tracks.

In at least some exemplary embodiments, the exemplary disclosed system, apparatus, and method may provide an efficient and effective public or private transportation system. For example, the exemplary disclosed system, apparatus, and method may minimize or avoid travel delays for passengers, provide increased flexibility for travel times and routes to passengers, and/or reduce physical exertion associated with transporting luggage and for moving goods. The exemplary disclosed system, apparatus, and method may also reduce pollution and carbon emissions. Also, the exemplary disclosed system, apparatus, and method may provide a public or private transportation system that provides a dedicated vehicle to a passenger or family or group of friends, moves at relatively fast speeds, and provides a direct trip without layovers, transfers, and/or stopping. The exemplary disclosed system, apparatus, and method may also move goods between facilities, warehouses, factories, commercial locations, and/or any other suitable locations.

It will be apparent to those skilled in the art that various modifications and variations can be made to the exemplary disclosed system, apparatus, and method. Other embodiments will be apparent to those skilled in the art from consideration of the specification and practice of the exemplary disclosed apparatus, system, and method. It is intended that the specification and examples be considered as exemplary, with a true scope being indicated by the following claims.

What is claimed is:
1. A method, comprising:
moving a vehicle having a plurality of wheels along a track;
receiving a marker data or a marker signal from a networked active transmitter-receiver marker at a location of a track pathway of the track as the vehicle is about to pass or is passing the location using an active electronic reader of the vehicle, the transmitter-receiver marker including one or more sensors;
sensing an ambient condition at the location of the track pathway using the one or more sensors, the marker data or the marker signal being based at least on the sensed ambient condition;
controlling a first rotational speed of a first wheel of the plurality of wheels at the location of the track pathway based on the marker data or the marker signal based at least on the sensed ambient condition; and
controlling a second rotational speed of a second wheel of the plurality of wheels at the location of the track pathway, independently of the first rotational speed, based on the marker data or the marker signal based at least on the sensed ambient condition;
wherein the first rotational speed is different from the second rotational speed;
wherein the ambient condition sensed by the one or more sensors includes at least one of wind velocity, humidity, or temperature at the location of the track pathway of the transmitter-receiver marker when the vehicle is about to pass or is passing the location;
wherein controlling the first rotational speed and the second rotational speed is based on a radius of curvature and a length of the track at the location of the track pathway, data of the radius of curvature and the length of the track being stored in an onboard database of the vehicle;

looking up the data of the radius of curvature and the length from the onboard database using a controller of the vehicle based on the marker data or the marker signal that is a unique identifier of the transmitter-receiver marker that identifies the transmitter-receiver marker out of a plurality of transmitter-receiver markers disposed along the track; and supporting at least one wheel of the plurality of wheels of the vehicle in a U-shaped portion of the track, the U-shaped portion countering centrifugal forces of the plurality of wheels based on the at least one wheel of the plurality of wheels riding up a slope of the U-shaped portion when the vehicle makes turns by varying rotational speeds between the plurality of wheels.

2. The method of claim 1, further comprising turning the vehicle at an intersection structure of the location of the track pathway, without a mechanical switch, based on controlling the first rotational speed of the first wheel that is different from the second rotational speed of the second wheel.

3. The method of claim 2, wherein turning the vehicle at the intersection structure includes moving the first wheel and the second wheel through a plurality of openings or spaces of the intersection structure.

4. The method of claim 1, further comprising:
moving the vehicle forward by driving the first wheel and the second wheel;
moving the vehicle backward by driving a third wheel and a fourth wheel of the plurality of wheels; and
accelerating the vehicle or moving the vehicle on the track when the track is inclined by driving the first wheel, the second wheel, the third wheel, and the fourth wheel.

5. The method of claim 1, further comprising driving the first wheel and the second wheel using a plurality of motors powered by solar energy.

6. The method of claim 5, further comprising:
collecting the solar energy using solar power collectors disposed along the track;
transferring the solar energy along the track using a power rail; and
transferring the solar energy from the power rail to the vehicle.

7. An apparatus for a vehicle having a plurality of wheels that moves along a track, comprising:
a networked active transmitter-receiver marker configured to be disposed at a location of a track pathway of the track, the transmitter-receiver marker including one or more sensors configured to sense an ambient condition at the location of the track pathway;
an active electronic reader configured to be disposed at the vehicle, the active electronic reader configured to receive a marker data or a marker signal from the transmitter-receiver marker as the vehicle is about to pass or is passing the location of the track pathway, the marker data or the marker signal being based at least on the sensed ambient condition; and
a controller configured to be disposed on the vehicle, the controller configured to control turning of the vehicle, without a mechanical switch, based on:
controlling a first rotational speed of a first wheel of the plurality of wheels at the location of the track pathway based on the marker data or the marker signal based at least on the sensed ambient condition; and
controlling a second rotational speed of a second wheel of the plurality of wheels at the location of the track pathway, independently of the first rotational speed, based on the marker data or the marker signal based at least on the sensed ambient condition;
wherein the first rotational speed is different from the second rotational speed; and
wherein the ambient condition sensed by the one or more sensors includes at least one of wind velocity, humidity, or temperature at the location of the track pathway of the transmitter-receiver marker when the vehicle is about to pass or is passing the location;
controlling the first rotational speed and the second rotational speed based on a radius of curvature and a length of the track at the location of the track pathway, data of the radius of curvature and the length of the track being stored in an onboard database of the vehicle; and
looking up the data of the radius of curvature and the length from the onboard database using a controller of the vehicle based on the marker data or the marker signal that is a unique identifier of the transmitter-receiver marker that identifies the transmitter-receiver marker out of a plurality of transmitter-receiver markers disposed along the track;
wherein at least one wheel of the plurality of wheels of the vehicle are supported in a U-shaped portion of the track, the U-shaped portion countering centrifugal forces of the plurality of wheels based on the at least one wheel of the plurality of wheels riding up a slope of the U-shaped portion when the vehicle makes turns by varying rotational speeds between the plurality of wheels.

8. The apparatus of claim 7, wherein the controller is configured to communicate with at least one of a system controller and the onboard database or a remote database that is communicated with via a network, the controller configured to utilize data of a unique identifier of the transmitter-receiver marker that identifies the transmitter-receiver marker out of the plurality of transmitter-receiver markers disposed along the track, the unique identifier being based on the marker data or the marker signal.

9. The apparatus of claim 7, wherein the controller is configured to communicate with at least one of a system controller and the onboard database or a remote database that is communicated with via a network, the controller configured to transfer data of the unique identifier of the vehicle that identifies the vehicle out of a plurality of vehicles disposed along the track.

10. The method of claim 7, wherein the one or more sensors includes at least one of an anemometer, a hygrometer, or a thermometer.

11. A method, comprising:
moving a plurality of vehicles along a plurality of tracks, each of the plurality of vehicles including an active electronic reader and a plurality of wheels;
receiving a marker data or a marker signal from a networked active transmitter-receiver marker at a location of a track pathway of the plurality of tracks as at least one vehicle of the plurality of vehicles is about to pass or is passing the location using the active electronic reader of the at least one vehicle, the transmitter-receiver marker including one or more sensors;
sensing an ambient condition at the location of the track pathway using the one or more sensors, the marker data or the marker signal being based at least on the sensed ambient condition;

controlling a first rotational speed of a first wheel of the plurality of wheels of the at least one vehicle at the location of the track pathway based on the marker data or the marker signal based at least on the sensed ambient condition;

controlling a second rotational speed of a second wheel of the plurality of wheels of the at least one vehicle at the location of the track pathway, independently of the first rotational speed, based on the marker data or the marker signal based at least on the sensed ambient condition;

wherein the first rotational speed is different from the second rotational speed;

wherein the ambient condition sensed by the one or more sensors includes at least one of wind velocity, humidity, or temperature at the location of the track pathway of the transmitter-receiver marker when the at least one vehicle is about to pass or is passing the location;

wherein controlling the first rotational speed and the second rotational speed of the at least one vehicle is based on a radius of curvature and a length of the track at the location of the track pathway, data of the radius of curvature and the length of the track being stored in an onboard database of the at least one vehicle;

looking up the data of the radius of curvature and the length from the onboard database using a controller of the at least one vehicle based on the marker data or the marker signal that is a unique identifier of the transmitter-receiver marker that identifies the transmitter-receiver marker out of a plurality of transmitter-receiver markers disposed along the track; and supporting at least one wheel of the plurality of wheels of the at least one vehicle of the plurality of vehicles in a U-shaped portion of the plurality of tracks, the U-shaped portion countering centrifugal forces of the plurality of wheels of the at least one vehicle based on the at least one wheel of the plurality of wheels riding up a slope of the U-shaped portion when the at least one vehicle makes turns by varying rotational speeds between the plurality of wheels.

12. The method of claim 11, further comprising moving the plurality of vehicles along the plurality of tracks using solar energy.

13. The method of claim 11, further comprising turning the plurality of vehicles based on varying the rotational speeds of the plurality of wheels of each of the plurality of vehicles.

14. The method of claim 13, wherein the plurality of tracks, on which the plurality of vehicles turns, is a plurality of switchless tracks lacking mechanical switches.

15. The method of claim 11, further comprising moving the plurality of vehicles between a plurality of trip start locations and a plurality of trip end locations via a plurality of transfer hubs that transfer the plurality of vehicles between different track lines of the plurality of tracks, the plurality of vehicles continuously moving and not stopping while moving through the plurality of transfer hubs.

16. The method of claim 11, wherein the plurality of tracks are structurally supported by a plurality of structural assemblies including a plurality of guard members disposed above the plurality of tracks, the plurality of guard members covering the plurality of tracks.

17. The method of claim 11, wherein the one or more sensors includes a track monitoring sensor configured to detect at least one of track vibration, track structural fatigue, track structural fracture, or track temperature.

* * * * *